(12) United States Patent
Okamoto et al.

(10) Patent No.: US 10,171,173 B2
(45) Date of Patent: Jan. 1, 2019

(54) OPTICAL SIGNAL TRANSMISSION APPARATUS AND OPTICAL SIGNAL TRANSMISSION METHOD

(71) Applicant: NIPPON TELEGRAPH AND TELEPHONE CORPORATION, Tokyo (JP)

(72) Inventors: Seiji Okamoto, Yokosuka (JP); Koichi Ishihara, Yokosuka (JP); Etsushi Yamazaki, Yokosuka (JP); Mitsuteru Yoshida, Yokosuka (JP); Tomoyoshi Kataoka, Yokosuka (JP); Kazushige Yonenaga, Yokosuka (JP); Yoshiaki Kisaka, Yokosuka (JP); Masanori Nakamura, Yokosuka (JP); Masahito Tomizawa, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/122,582

(22) PCT Filed: Mar. 17, 2015

(86) PCT No.: PCT/JP2015/057831
§ 371 (c)(1),
(2) Date: Aug. 30, 2016

(87) PCT Pub. No.: WO2015/141658
PCT Pub. Date: Sep. 24, 2015

(65) Prior Publication Data
US 2017/0070296 A1 Mar. 9, 2017

(30) Foreign Application Priority Data

Mar. 17, 2014 (JP) .................................. 2014-054110
Oct. 30, 2014 (JP) .................................. 2014-221662

(51) Int. Cl.
*H04B 10/50* (2013.01)
*H04B 10/516* (2013.01)
(Continued)

(52) U.S. Cl.
CPC ....... *H04B 10/516* (2013.01); *H04B 10/0775* (2013.01); *H04B 10/2513* (2013.01);
(Continued)

(58) Field of Classification Search
CPC ........................... H04B 10/516; H04B 10/508
See application file for complete search history.

(56) References Cited

U.S. PATENT DOCUMENTS

2005/0031342 A1 2/2005 Wu et al.
2008/0310531 A1* 12/2008 Bai ..................... H04L 25/0226
375/260
(Continued)

FOREIGN PATENT DOCUMENTS

EP 2434665 A1 3/2012
EP 2456097 A1 5/2012
(Continued)

OTHER PUBLICATIONS

H. Masuda, et al., "13.5-Tb/s (135x111-Gb/s/ch) No-Guard-Interval Coherent OFDM Transmission over 6, 248 km using SNR Maximized Second-order DRA in the Extended L-band", OSA/OFC/NFOEC 2009, PDPB5, 2009.
(Continued)

*Primary Examiner* — Dzung Tran
(74) *Attorney, Agent, or Firm* — Harness, Dickey & Pierce, P.L.C.

(57) ABSTRACT

An optical signal transmission apparatus includes a modulation unit which modulates a transmission signal, a training signal sequence generation unit which generates a plurality of signal sequences having power concentrated in a plurality
(Continued)

of different frequency bands, at least one of an amplitude and a phase of the plurality of signal sequences being modulated, as a training signal sequence, a signal multiplexing unit which appends the training signal sequence to the transmission signal, and an electro-optical conversion unit which converts a signal sequence obtained by appending the training signal sequence to the transmission signal into an optical signal and transmits the optical signal.

18 Claims, 20 Drawing Sheets

(51) Int. Cl.
　　H04B 10/2513　　(2013.01)
　　H04L 27/34　　(2006.01)
　　H04B 10/508　　(2013.01)
　　H04B 10/077　　(2013.01)
　　H04B 10/2557　　(2013.01)
　　H04L 27/36　　(2006.01)

(52) U.S. Cl.
　　CPC ....... *H04B 10/2557* (2013.01); *H04B 10/508* (2013.01); *H04L 27/3483* (2013.01); *H04L 27/3455* (2013.01); *H04L 27/366* (2013.01)

(56) References Cited

U.S. PATENT DOCUMENTS

| | | |
|---|---|---|
| 2012/0070159 A1 | 3/2012 | Ishihara et al. |
| 2012/0099864 A1* | 4/2012 | Ishihara .................. H04B 3/06 398/65 |
| 2013/0243439 A1 | 9/2013 | Ito |
| 2014/0079408 A1* | 3/2014 | Yan .................... H04B 10/2507 398/152 |

FOREIGN PATENT DOCUMENTS

| | | |
|---|---|---|
| JP | 2002-511709 A | 4/2002 |
| WO | WO-99/53665 A1 | 10/1999 |
| WO | WO-2010/134321 A1 | 11/2010 |

OTHER PUBLICATIONS

J. Yu, et al., "17 Tb/s (161x114 Gb/s) PolMux-RZ-8PSK transmission over 662 km of ultra-low loss fiber using C-band EDFA amplification and digital coherent detection", ECOC 2008, Th. 3. E. 2, Brussels, Belgium, Sep. 21-25, 2008.

L. Liu, et al., "Initial Tap Setup of Constant Modulus Algorithm for Polarization De-multiplexing in Optical Coherent Receivers", OSA/OFC/NFOEC 2009, OMT2, 2009.

IEEE, "Part 11: Wireless LAN Medium Access Control (MAC) and Physical Layer (PHY) Specifications Amendment 5: Enhancements for Higher Throughput", IEEE 802.11 n-2009, Oct. 2009.

G. P. Agrawal, "Nonlinear fiber optics", Fourth Edition, Elsevier, pp. 182-183, 2007.

International Search Report for PCT/JP2015/057831, ISA/JP, Tokyo, dated May 19, 2015 with English translation.

Partial Supplemental European Search Report for parallel application EP15765440.1, EPO, Munich, dated Aug. 29, 2017.

* cited by examiner

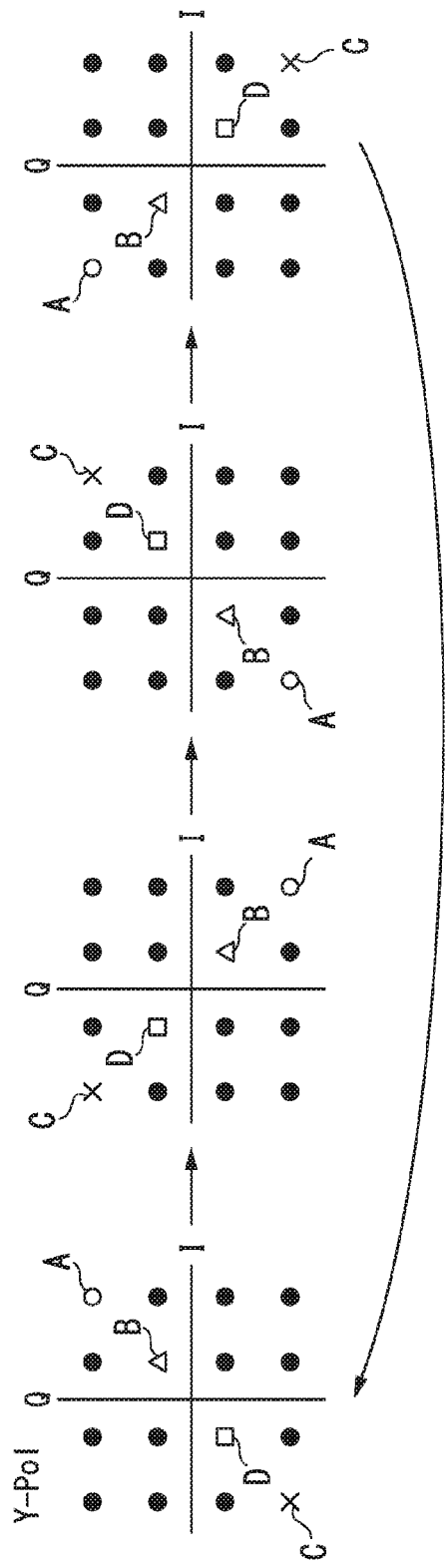

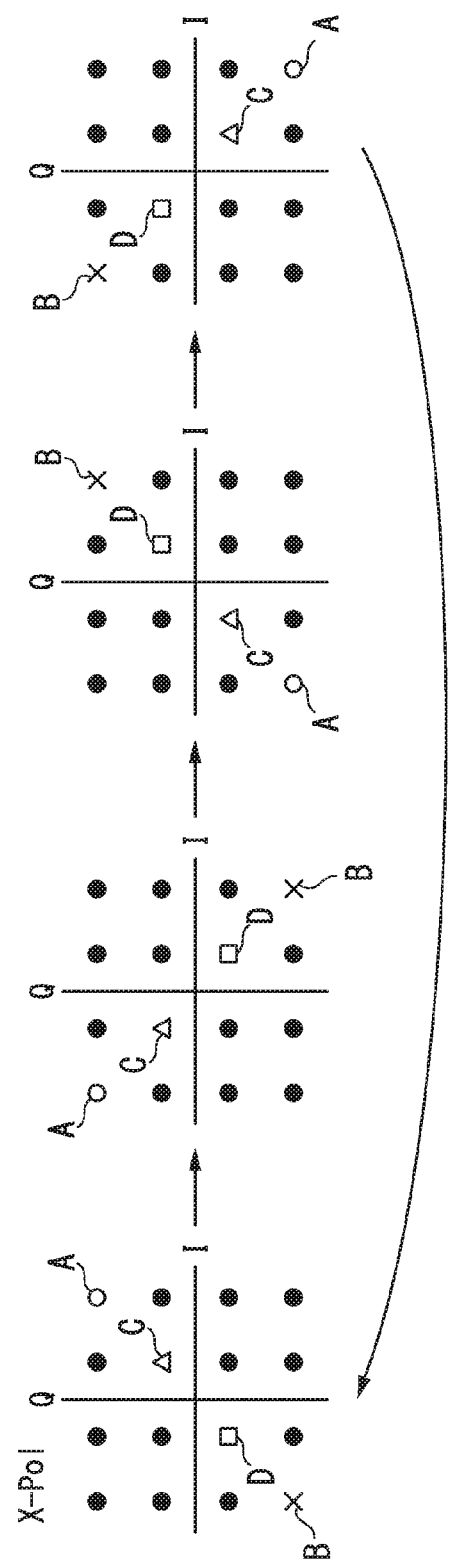

OPTICAL SIGNAL TRANSMISSION APPARATUS AND OPTICAL SIGNAL TRANSMISSION METHOD

CROSS-REFERENCE TO RELATED APPLICATIONS

This application is a 371 U.S. National Stage of International Application No. PCT/JP2015/057831, filed Mar. 17, 2015, which claims priority to Japanese Patent Applications No. 2014-054110, filed Mar. 17, 2014, and 2014-221662, filed Oct. 30, 2014, the contents of all of which are incorporated herein by reference.

TECHNICAL FIELD

The present invention relates to technology of optical communication.

BACKGROUND ART

In the field of optical communication, communication systems that combine a synchronous detection scheme and signal processing for dramatically improving spectral efficiency are attracting attention. This type of communication system can further improve reception sensitivity than systems constructed in accordance with direction detection. Further, such a communication system receives a transmission signal as a digital signal, and thus it can perform signal position detection, frequency offset compensation, clock offset compensation, and compensation for waveform distortion due to linear effects, such as chromatic dispersion compensation and polarization-mode dispersion (PMD) compensation by signal processing of the received digital signal. In addition, it is known that such a communication system has strong tolerance even to signal quality deterioration due to non-linear effects by performing digital compensation. Therefore, introduction of such a communication system is being examined as a next generation optical communication technology.

A digital coherent scheme as described in Non-Patent Documents 1 and 2 adopts a method for compensating for quasi-static chromatic dispersion by means of a digital filter having a fixed number of taps (e.g., the number of taps is 2048 for a dispersion of 20000 ps/nm and a signal of 28 Gbaud) and compensating for fluctuating polarization-mode dispersion by means of an adaptive filter having a small number of taps (e.g., about 10 to 12 taps for a polarization-mode dispersion of 50 ps) using a blind algorithm. Also, as described in Non-Patent Document 3, polarization-division multiplexing transmission is attracting attention with an increase of a transfer rate.

It is to be noted that Non-Patent Document 4 describes establishment of synchronous in wireless communication. Moreover, Non-Patent Document 5 describes cross-phase modulation, which is a non-linear optical effect caused by an adjacent wavelength, in wavelength-division multiplexing transmission.

As described in Non-Patent Document 4, in the IEEE 802.11a standard, which is a wireless local area network (LAN) standard in wireless communication, it is possible to estimate frequency offset and clock offset by means of a frame configuration in which a short preamble signal and/or a long preamble signal is inserted as a training signal into a head of a transmission signal. Then, it is possible to establish synchronization by compensating for these offsets based on an estimated result.

On the other hand, because there is a problem unique to an optical signal, such as chromatic dispersion, in optical communication, it is difficult to correctly detect a received bit due to the chromatic dispersion and thus it is difficult to detect the above-described short preamble signal and long preamble signal at a receiving end. With respect to this point, it is possible to detect a training pattern by generating a specific frequency band signal having signal components with a smaller frequency spreading relative to a spectrum of a signal sequence to be transmitted at a plurality of specific frequencies, inserting the generated specific frequency band signal into the signal sequence to be transmitted, and providing a circuit having high detection sensitivity for the specific frequency band signal at the receiving end (Non-Patent Document 1).

Also, by individually detecting a plurality of specific frequency band signals at the receiving end, it is possible to estimate a chromatic dispersion amount from their arrival time differences and their central frequency differences. Further, by estimating the central frequency of the specific frequency band signal, it is possible to estimate a frequency offset between a transmitting-end laser and a receiving-end local oscillator laser. As a result, it is possible to detect the chromatic dispersion and the frequency offset for even a signal of about 100 Gbp using the above-described means.

PRIOR ART DOCUMENTS

Patent Document

Patent Document 1: PCT International Publication No. WO 2010/134321

Non-Patent Documents

Non-Patent Document 1: H. Masuda, et al., "13.5-Tb/s (135×111-Gb/s/ch) No-Guard-Interval Coherent OFDM Transmission over 6,248 km using SNR Maximized Second-order DRA in the Extended L-band", OSA/OFC/NFOEC 2009, PDPBS, 2009.

Non-Patent Document 2: J. Yu, et al., "17 Tb/s (161×114 Gb/s) PolMux-RZ-8PSK Transmission over 662 km of Ultra-Low Loss Fiber using C-band EDFA Amplification and Digital Coherent Detection", ECOC 2008, Th. 3. E. 2, Brussels, Belgium, 21-25 Sep. 2008.

Non-Patent Document 3: L. Liu, et al., "Initial Tap Setup of Constant Modulus Algorithm for Polarization De-multiplexing in Optical Coherent Receivers", OSA/OFC/NFOEC 2009, OMT2, 2009.

Non-Patent Document 4: IEEE, "Part 11: Wireless LAN Medium Access Control (MAC) and Physical Layer (PHY) Specifications Amendment 5: Enhancements for Higher Throughput", IEEE 802.11n-2009, October 2009.

Non-Patent Document 5: G. P. Agrawal, "Nonlinear Fiber Optics", Fourth Edition, Elsevier, pp. 182-183, 2007.

SUMMARY OF INVENTION

Problems to be Solved by the Invention

However, in wavelength-division multiplexing transmission, a change in optical power in adjacent channels causes a change in a carrier phase of a channel of interest via a cross-phase modulation effect of an optical fiber transmission line and thus signal deterioration which increases an error rate is anticipated. Also, according to Non-Patent Document 5, a cross-phase modulation effect is a non-linear phase rotation effect which causes a phase rotation amount in proportion to instantaneous power of an optical signal.

Also, when modulation is performed on two independent polarizations in a polarization-division multiplexed signal using the same pattern, only a training interval is in a single polarized state. For example, according to Non-Patent Document 5, in cross-phase modulation, which is a non-linear optical effect from adjacent wavelengths, in wavelength-division multiplexing transmission, there is a difference in magnitudes of phase modulation between phase modulation given from parallel polarization and phase modulation given from orthogonal polarization, and a ratio of their phase modulation amounts is 3:2. Phase modulations generated in two polarizations in a disturbed channel are temporally averaged in a transmission path due to a walk-off effect. Because a correlation between data of two independent polarizations in a polarization-division multiplexed signal is small and the data is independently modulated, an instantaneous polarization state changes for each symbol. Because of temporal averaging due to the walk-off effect, the phase modulations generated in the two polarizations of the disturbed channel have approximately the same level. On the other hand, in the training interval, the instantaneous polarization state is uniform in a remarkable case. Thus, even when there is temporal averaging due to the walk-off effect, a phenomenon in which phase modulation amounts generated in the two polarizations of the disturbed channel are different from each other occurs. Thus, the polarization crosstalk increases, the error rate increases, and the transmission performance deteriorates.

Also, when the training pattern is the same in the two polarizations, instantaneous power of a composite single polarization signal is doubled. Thus, the magnitude of the phase rotation amount due to the cross-phase modulation effect is doubled and the phase rotation amount is greater than that when a pattern having an irregular polarization state is transmitted and there is a possibility that an error rate increases.

Also, even when training patterns are not the same in the two polarizations, the instantaneous polarization state of the training interval changes at a lower speed than that of adjacent intervals if its frequency spreading is small. Thus, even when there is temporal averaging due to the walk-off effect, a phenomenon in which a difference between phase modulation amounts generated in the two polarizations of the disturbed channel is generated occurs. As a result, the polarization crosstalk increases, the error rate increases, and the transmission performance deteriorates. That is, when the frequency spreading of the training pattern is small, the efficiency of occurrence of four-wave mixing, which is a non-linear optical effect of a transmission path fiber, increases, the cross-talk is generated in the disturbed channel, and there is a possibility that the error rate increases.

Also, when a signal component having small frequency spreading is inserted into a spectrum of a signal sequence to be transmitted, its frequency may overlap a frequency region in which a group delay amount is significantly changed due to a frequency in a peripheral analog device or the like. In this manner, if the inserted frequency overlaps a frequency having a large group delay amount of the analog device, there is a problem in that an error in an estimated value of chromatic dispersion is increased due to the group delay performance and an offset is generated in the estimated value.

Also, when the frequency of a specific frequency band signal inserted at a transmitting end is high, the optical power decreases only in a time interval in which the specific frequency band signal is inserted due to a frequency band limit of a peripheral analog device. This may increase the error rate by exerting an influence even on a time interval other than that of the specific frequency band signal due to a temporal change in an adjustment gain of an optical amplifier for uniformly maintaining power of a transmission path interval, an electric amplifier for uniformly maintaining input power to an analog-to-digital converter (ADC), a digital amplitude adjuster for uniformly maintaining an average input amplitude for a digital discrimination or soft-decision discriminator, or the like.

Also, if optical power decreases only in the time interval in which the specific frequency band signal is inserted due to the frequency band limit of the peripheral analog device when the frequency of the specific frequency band signal inserted at the transmitting end is high, the transmission performance may be deteriorated due to a non-linear optical effect occurring in an optical fiber transmission path. There is a characteristic that a change in instantaneous optical signal power leads to a change in a carrier phase due to the non-linear optical effect occurring in the optical fiber transmission path. Thus, the change in the instantaneous optical power of the time interval in which the specific frequency band signal is inserted is converted into the change in the carrier phase, which causes an increase of the error rate in the phase modulation signal.

Also, because the phase rotation amount caused by the cross-phase modulation effect is greater than that of the data sequence if the amplitude of the specific frequency band signal inserted at the transmitting end is greater than that of the data sequence, the deterioration of the transmission performance resulting from the above cross-phase modulation increases and the error rate may increase.

In view of the above-described circumstances, an object of the present invention is to provide technology for suppressing the deterioration of performance and quality of a data signal due to a training signal.

Means for Solving the Problems

An aspect of the present invention is an optical signal transmission apparatus including: a modulation unit which modulates a transmission signal; a training signal sequence generation unit which generates a plurality of signal sequences which have power concentrated in a plurality of different frequency bands, at least one of an amplitude and a phase of the plurality of signal sequences being modulated, as a training signal sequence; a signal multiplexing unit which appends the training signal sequence to the transmission signal; and an electro-optical conversion unit which converts a signal sequence obtained by appending the training signal sequence to the transmission signal into an optical signal and transmit the optical signal.

An aspect of the present invention is the above-described optical signal transmission apparatus, wherein the training signal sequence generation unit includes: a basic signal sequence generation unit which generates a specific frequency band signal in which a frequency component having higher power than a data sequence is concentrated only in a specific frequency band; a modulation sequence generation unit which generates a modulation sequence for modulating the frequency component; and a multiplier which multiplies an output sequence of the basic signal sequence generation unit by an output sequence of the modulation sequence generation unit.

An aspect of the present invention is the above-described optical signal transmission apparatus, wherein the modulation sequence generation unit modulates at least one of the amplitude and the phase so that a power component that is present in the specific frequency band of the specific frequency band signal and is higher than that of the data sequence is subjected to frequency spreading.

An aspect of the present invention is the above-described optical signal transmission apparatus, wherein the modulation sequence generation unit generates the modulation sequence based on estimation precision of a transmission path parameter and a performance deterioration factor in at least one of an analog device and a propagation path.

An aspect of the present invention is the above-described optical signal transmission apparatus, wherein the modulation sequence generation unit generates a sequence which changes at a time interval of a main signal symbol of N symbols as the modulation sequence, and adjusts a degree of modulation of the frequency component of the specific frequency band signal by setting a value of N based on the estimation precision of the transmission path parameter and the performance deterioration factor in at least one of the analog device and the propagation path and changing a modulation rate of the generated modulation sequence.

An aspect of the present invention is the above-described optical signal transmission apparatus, wherein the modulation sequence generation unit generates the modulation sequence based on an effective pass bandwidth of cross-phase modulation, which is a non-linear optical effect of a transmission path, and a baud rate of a main signal.

An aspect of the present invention is the above-described optical signal transmission apparatus, wherein the training signal sequence generation unit generates the training signal sequence by performing modulation in which at least one of the amplitude and the phase is different between first polarization and second polarization which are different from each other.

An aspect of the present invention is the above-described optical signal transmission apparatus, wherein the training signal sequence generation unit determines pattern phases and low cycle patterns of training signal sequences in the first polarization and the second polarization so that a correlation between the first polarization and the second polarization is lowest in a pattern obtained by calculating a product or exclusive OR of the training signal sequences in the first polarization and the second polarization.

An aspect of the present invention is the above-described optical signal transmission apparatus, wherein the training signal sequence generation unit generates the training signal sequence from M candidate points when multi-level modulation of an M level is performed on the transmission signal.

An aspect of the present invention is the above-described optical signal transmission apparatus, wherein the training signal sequence generation unit generates the training signal sequence by limiting phase modulation serving as polarization scrambling to 90 degrees.

An aspect of the present invention is the above-described optical signal transmission apparatus, wherein when the multi-level modulation of the M level is performed on the transmission signal, the training signal sequence generation unit selects candidate points which are smaller in number than M and are symmetrical with respect to an origin from among the M candidate points and generates the training signal sequence using the selected candidate points.

An aspect of the present invention is the above-described optical signal transmission apparatus and further includes a training signal determination unit which determines the training signal sequence in accordance with a parameter of a required condition, wherein the training signal determination unit determines the signal sequence by performing clipping on an initial sequence for generation of the training signal sequence using a frequency filter which simulates a shape of a frequency spectrum of the training signal sequence satisfying the required condition.

An aspect of the present invention is the above-described optical signal transmission apparatus, wherein the training signal determination unit makes initial sequences for generation of the training signal sequence different between the first polarization and the second polarization.

An aspect of the present invention is the above-described optical signal transmission apparatus, wherein the training signal determination unit performs a hard decision in accordance with a modulation scheme of the transmission signal on the training signal sequence subjected to the clipping by the frequency filter.

An aspect of the present invention is the above-described optical signal transmission apparatus, wherein the training signal determination unit iterates the hard decision in accordance with the clipping by the frequency filter and the modulation scheme of the transmission signal.

An aspect of the present invention is the above-described optical signal transmission apparatus, wherein the modulation sequence generation unit modulates at least one of the amplitude and the phase so that a power component that is present in the specific frequency band of the specific frequency band signal and is higher than that of a data sequence is not subjected to frequency spreading.

An aspect of the present invention is the above-described optical signal transmission apparatus, wherein the modulation sequence generation unit modulates at least one of the amplitude and the phase so that power of the training signal sequence is equal to or less than power of the data sequence.

An aspect of the present invention is an optical signal transmission method including: modulating a transmission signal; generating a plurality of signal sequences having power concentrated in a plurality of different frequency bands, at least one of an amplitude and a phase of the plurality of signal sequences being modulated, as a training signal sequence; appending the training signal sequence to the transmission signal; and converting a signal sequence obtained by appending the training signal sequence to the transmission signal into an optical signal and transmitting the optical signal.

Advantageous Effects of the Invention

In accordance with the present invention, the optical signal transmission apparatus generates training signal sequences which are less susceptible to an influence of a performance deterioration factor due to a cross-phase modulation effect occurring in an analog device and/or an optical fiber transmission path, which are a plurality of signal sequences which have power concentrated on a plurality of frequency bands in which in the optical signal reception apparatus can perform frame synchronization, frequency synchronization, chromatic dispersion estimation, and the like, which have power concentrated on different frequency bands, and which are modulated. In the optical signal reception apparatus, the frame synchronization, the frequency synchronization, and the chromatic dispersion estimation can be performed using the received training signal sequence and an influence of a performance deterioration factor due to a cross-phase modulation effect or the like occurring in an analog device and/or an optical fiber transmission path can be reduced.

BRIEF DESCRIPTION OF DRAWINGS

FIG. 6B is a first example of symbol mapping of a training signal sequence in the second embodiment of the present invention.

FIG. 7A is a second example of symbol mapping of a training signal sequence.

MODES FOR CARRYING OUT THE INVENTION

Hereinafter, embodiments of the present invention will be described in detail with reference to the drawings. An optical signal transmission apparatus and an optical signal reception apparatus in the embodiments of the present invention are used in, for example, a coherent communication system such as an optical fiber transmission system which performs synchronization detection using an optical signal.

First Embodiment

Figure 1:
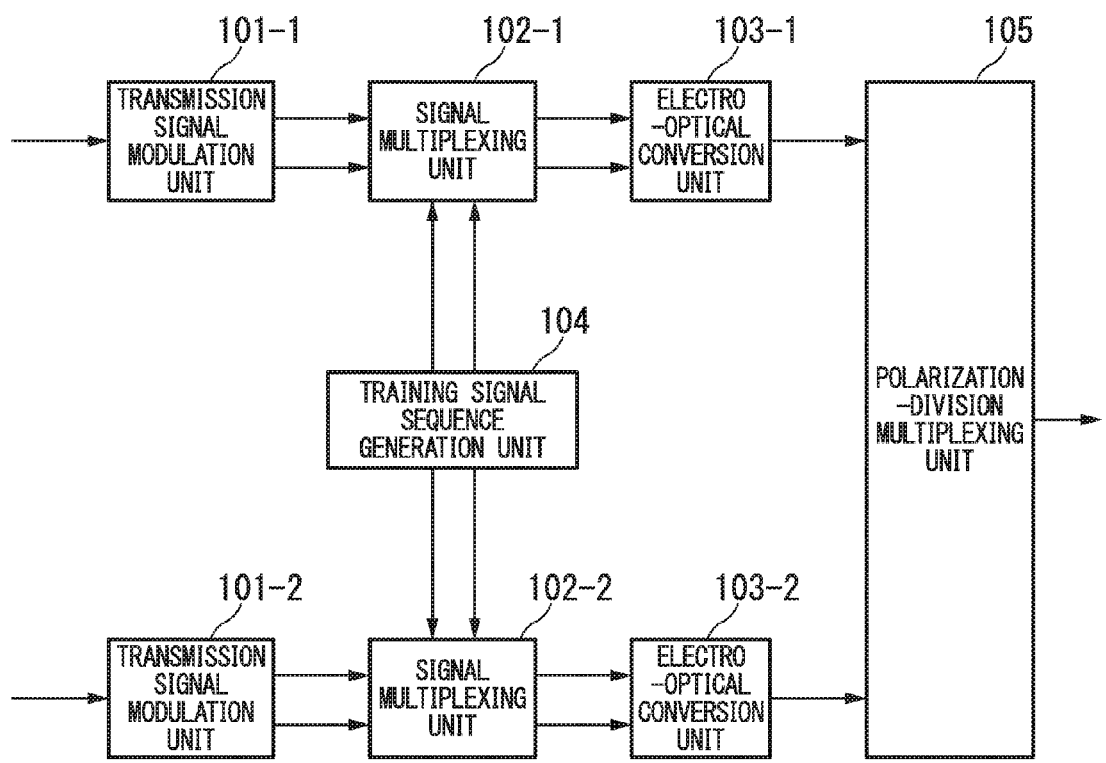
FIG. 1 is a block diagram illustrating a configuration example of an optical signal transmission apparatus in a first embodiment of the present invention.
Figure 2:
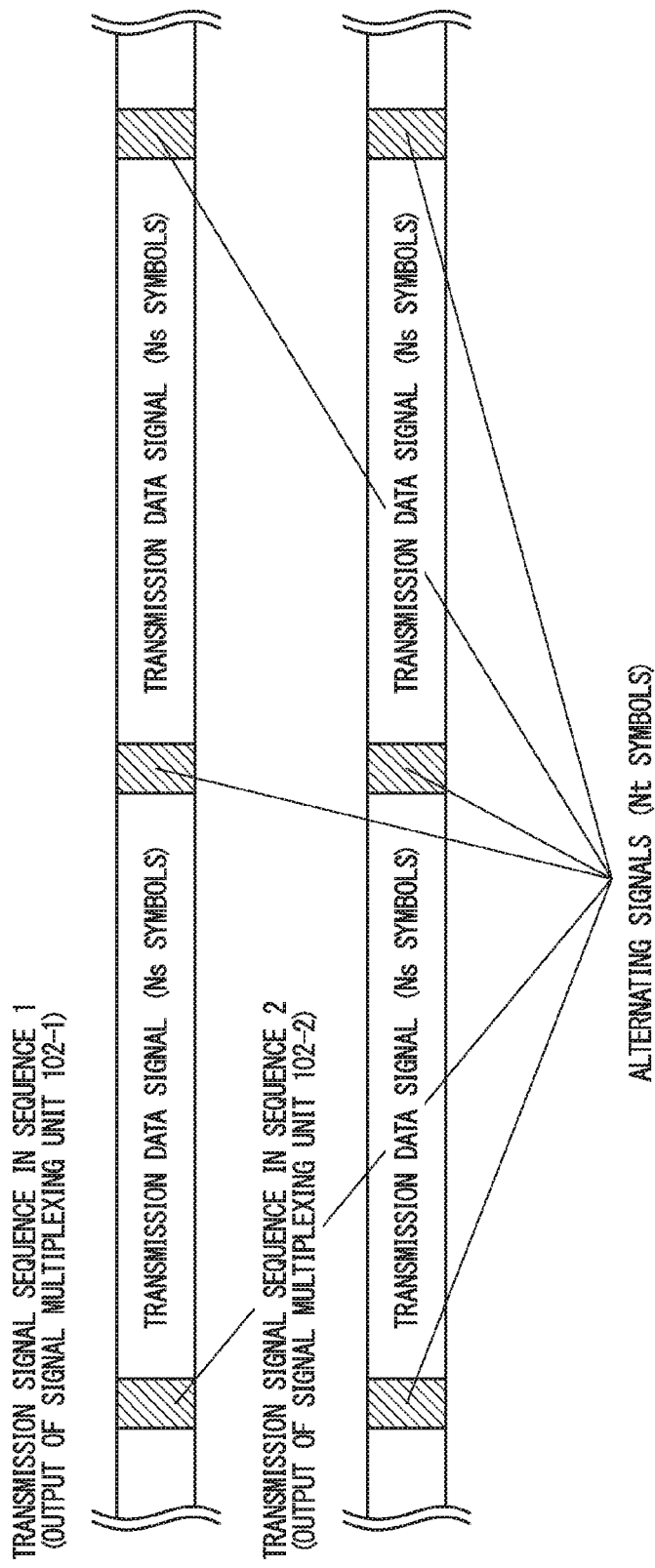
FIG. 2 is a diagram illustrating an example of a transmission signal sequence output by the optical signal transmission apparatus in the first embodiment of the present invention.

FIG. 1 is a block diagram illustrating a configuration example of an optical signal transmission apparatus in the first embodiment of the present invention. In FIGS. 1, 101-1 and 101-2 denote transmission signal modulation units, 102-1 and 102-2 denote signal multiplexing units, 103-1 and 103-2 denote electro-optical conversion units, 104 denotes a training signal sequence generation unit, and 105 denotes a polarization-division multiplexing unit. The optical signal transmission apparatus includes the transmission signal modulation units 101-1 and 101-2, the signal multiplexing units 102-1 and 102-2, the electro-optical conversion units 103-1 and 103-2, the training signal sequence generation unit 104, and the polarization-division multiplexing unit 105. It is to be noted that an example of polarization-division multiplexing transmission using two orthogonal polarizations (X polarization and Y polarization) will be described as follows, but such a configuration may not be necessary and transmission using only one of the polarizations or transmission using three or more polarizations can also be used.

The transmission signal modulation units 101-1 and 101-2 modulate binary sequences of data to be transmitted in the X and Y polarizations and output transmission symbol sequences (I phase (in-phase) and Q phase (quadrature phase)). A modulation scheme includes, for example, binary phase shift keying (BPSK) modulation, quadrature phase shift keying (QPSK) modulation, and quadrature amplitude modulation (QAM), but other modulation schemes may be used. The training signal sequence generation unit 104 generates and outputs sequences that satisfy the conditions listed above as training signal sequences (I-phase and Q-phase).

The signal multiplexing units 102-1 and 102-2 input the outputs of the transmission signal modulation units 101-1 and 101-2 in the X- and Y-polarizations and the outputs of the training signal sequence generation unit 104. Then, the signal multiplexing units 102-1 and 102-2 insert (multiplex in the time domain) the training signal sequences into the transmission symbol sequences for every any signal cycle Ns (Ns≥1 and Ns is a positive number) and output resultant signal sequences. The electro-optical conversion units 103-1 and 103-2 perform electro-optical conversion on the signal sequences using the outputs of the signal multiplexing units 102-1 and 102-2 as inputs and output optical signals.

FIG. 2 is a diagram illustrating an example of a transmission signal sequence output by the optical signal transmission apparatus in the present embodiment. As illustrated in FIG. 2, a transmission signal sequence is generated by time-division multiplexing a training signal including Nt (Nt≥1 and Nt is a positive number) symbols and a transmission data signal for every Ns symbol. It is to be noted that the training signal may also be referred to as a reference signal, a pilot signal, a known signal, or the like. Here, sequence 1 and sequence 2 are transmission signal sequences in the X-polarization and the Y-polarization, respectively, but it may not be necessary for the sequences of the X-polarization and the Y-polarization to be different from each other and the same sequence (e.g., only sequence 1) may be transmitted in both polarizations of the X-polarization and the Y-polarization.

As described above, in the optical signal transmission apparatus in the first embodiment of the present invention, the training signal sequences are added to the transmission signals in the signal multiplexing units 102-1 and 102-2. Here, a pattern of a training signal sequence which is not easily affected by the performance deterioration factor caused by analog devices, an optical fiber transmission path, or the like needs to satisfy the following conditions.

(1) Frequency components having high power only in a specific frequency band should not be concentrated in a frequency region which is subjected to a band limitation by a peripheral analog device. Specifically, the use of an alternating signal sequence pattern and the transmission of a signal only in a specific subcarrier as in orthogonal frequency division multiplexing (OFDM) are to be avoided because it is easily affected by the above-described performance deterioration factor.

(2) A pattern of the training signal sequence should be set so that a correlation between modulation patterns of two different polarizations (e.g., X-polarization and Y-polarization) decreases. It is to be noted that it is desirable for the correlation to be smaller.

(3) Modulation should be applied to a pattern of a training signal sequence in a cycle shorter than a window width of temporal averaging due to a walk-off effect capable of being expected in a transmission path. That is, a specific frequency band signal of each specific frequency should have a characteristic that a frequency distribution width thereof is wider than an effective pass band width of cross-phase modulation, which is a non-linear optical effect in a transmission path.

(4) An influence of a deterioration factor (a band limitation, a group delay ripple, and the like) by analog devices in front end portions of the optical signal transmission/reception apparatuses should be avoided.

(5) A training signal sequence should satisfy at least one of the above-described (1) to (4) and have a plurality of signal sequences having power concentrated in a plurality of frequency bands in which the optical signal reception apparatus is capable of performing frame synchronization, frequency synchronization, and chromatic dispersion estimation, and the like, where the plurality of frequency bands have power concentrated in different frequency bands.

To satisfy the above conditions, the training signal sequence is generated as follows in the first embodiment of the present invention.

In the first embodiment of the present invention, the training signal sequence is generated by calculating a product (or exclusive OR) of a signal pattern for propagation path estimation having a high power density at a specific frequency and a low cycle random pattern which changes at a time interval of main signal symbols of N symbols. It is to be noted that the signal pattern for propagation path estimation having a high power density at a specific frequency is hereinafter referred to as a specific frequency band signal.

The specific frequency band signal is, for example, the following alternating pattern in which power is concentrated at half a symbol rate frequency.

$XI=(S,-S,S,-S, \ldots)$ $XQ=(S,-S,S,-S, \ldots)$ $YI=(S,-S,S,-S, \ldots)$ $YQ=(S,-S,S,-S, \ldots)$ Equations (1)

Here, XI, XQ, YI, and YQ respectively denote signal sequence vectors in an I-axis in the X-polarization, a Q-axis in the X-polarization, an I-axis in the Y-polarization, and a Q-axis in the Y-polarization, and S denotes a real number. Also, a pattern in which power is concentrated at ¼ of the symbol rate frequency includes the following alternating pattern of the two-symbol cycle.

$XI=(S,S,-S,-S,S,S,-S,-S \ldots)$ $XQ=(S,S,-S,-S,S,S,-S,-S \ldots)$ $YI=(S,S,-S,-S,S,S,-S,-S \ldots)$ $YQ=(S,S,-S,-S,S,S,-S,-S \ldots)$ Equations (2)

It is possible to generate a sequence which is not easily affected by a performance deterioration factor in analog devices and a propagation path by calculating a product of this alternating pattern and a different sequence.

Figure 3:
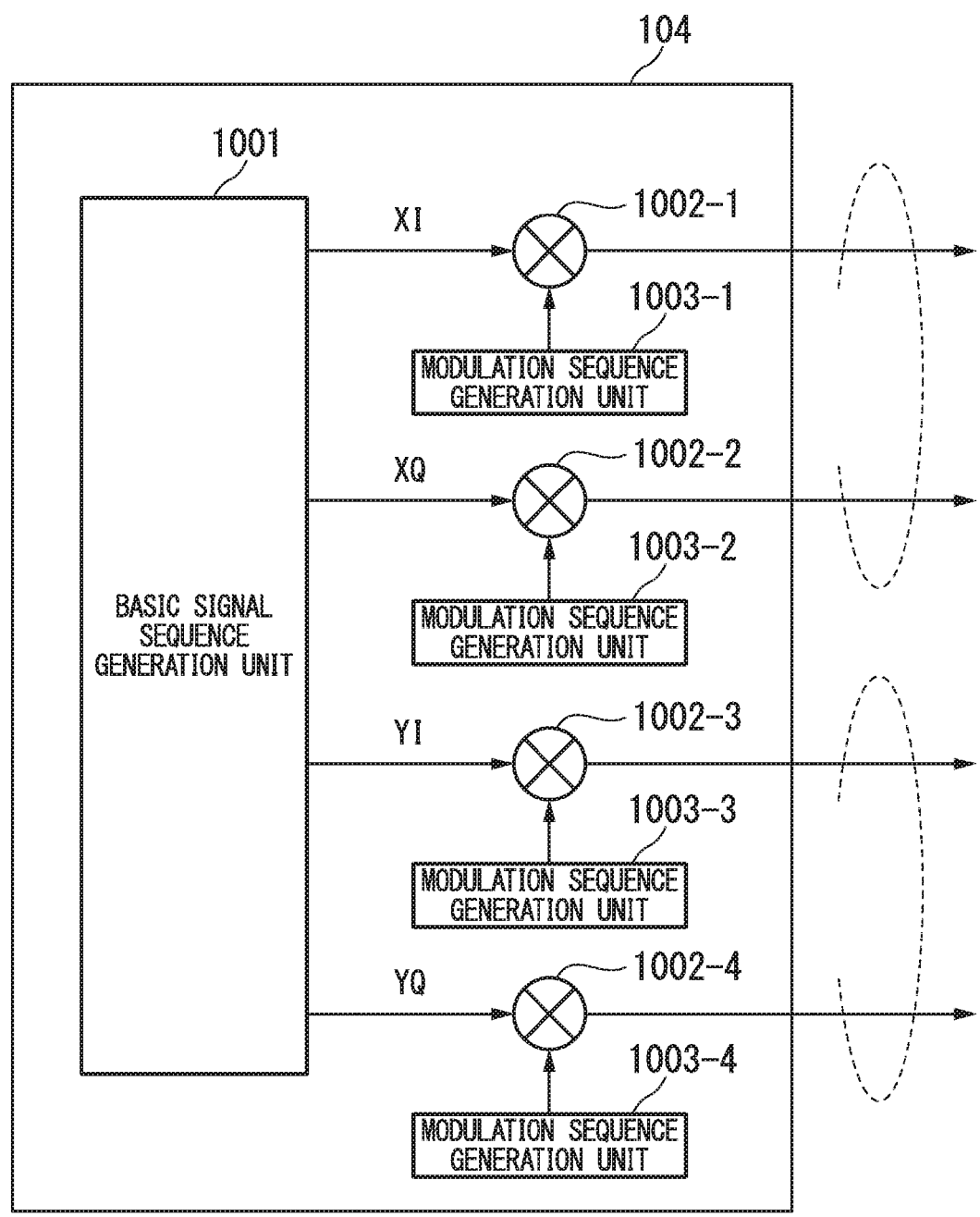
FIG. 3 is a diagram describing a training signal sequence generation unit 104 in the first embodiment of the present invention.

FIG. 3 is a diagram describing the training signal sequence generation unit 104 in the first embodiment of the present invention. In FIG. 3, 1001 denotes a basic signal sequence generation unit, 1002-1 to 1002-4 denote multipliers, and 1003-1 to 1003-4 denote modulation sequence generation units. The training signal sequence generation unit 104 includes the basic signal sequence generation unit 1001, the multipliers 1002-1 to 1002-4, and the modulation sequence generation units 1003-1 to 1003-4.

The basic signal sequence generation unit 1001 generates basic signal patterns (signal patterns for propagation path estimation, specific frequency band signal sequences, or the like). The generated sequences include, for example, the alternating patterns described above. The multipliers 1002-1 to 1002-4 multiply, for each symbol, the sequences from the basic signal sequence generation unit 1001 by the sequences input from the modulation sequence generation units 1003-1 to 1003-4 and output multiplied results to the signal multiplexing units 102-1 and 102-2.

The modulation sequence generation units 1003-1 to 1003-4 generate modulation sequences so that sequences of outputs of the multipliers 1002-1 to 1002-4 become sequences which are not easily affected by a performance deterioration factor in analog devices and a propagation path. For example, there is a method of using a pseudo-random sequence (PRBS: pseudo-random bit sequence) as a modulation sequence. In this case, pseudo-random sequences generated by generation polynomials which differ for the four modulation sequence generation units may be used and sequences generated by setting different initial values using the same generation polynomial may be used.

Further, it is possible to adjust a degree (spreading of a spectrum) of modulation of a basic signal pattern by changing a modulation rate of the generated modulation sequence. For example, when a sequence of V=(v1, v2, v3, . . . ) is used as the pseudo-random sequence (PRBS), a sequence such as a modulation sequence V8 increased by a factor of 8 or a modulation sequence V16 increased by a factor of 16 shown below which suppresses spreading of the spectrum is used if estimation precision of the transmission path using the training signal sequence is to be improved. Also, if the influence of the performance deterioration factor in the analog devices and the propagation path is large and the spreading of the spectrum is to be increased, a sequence such as a modulation sequence V2 increased by a factor of 2 or a modulation sequence V4 increased by a factor of 4 shown below is used.

The modulation sequence V8 increased by the factor of 8 is the following sequence.

$$V8=(v1,v1,v1,v1,v1,v1,v1,v1,v2,v2,v2,v2,v2,v2,v2,v2,$$
$$v3,v3,v3,v3,v3,v3,v3,v3,\ldots)$$

The modulation sequence V16 increased by the factor of 16 is the following sequence.

$$V16=(v1,v1,v1,v1,v1,v1,v1,v1,v1,v1,v1,v1,v1,v1,v1,v1,$$
$$v2,v2,v2,v2,v2,v2,v2,v2,v2,v2,v2,v2,v2,v2,v2,v2,$$
$$v3,v3,v3,v3,v3,v3,v3,v3,v3,v3,v3,v3,v3,v3,v3$$
$$v3,\ldots)$$

The modulation sequence V2 increased by the factor of 2 is the following sequence.

$$V2=(v1,v1,v2,v2,v3,v3,\ldots)$$

The modulation sequence V4 increased by the factor of 4 is the following sequence.

$$V4=(v1,v1,v1,v1,v2,v2,v2,v2,v3,v3,v3,v3,\ldots)$$

As described above, the spreading of the spectrum becomes smaller as N becomes larger by using a modulation sequence increased by a factor of N (N≥1 and N is an integer) as the sequence. Thus, it is possible to adjust a degree of modulation of a basic signal pattern. Also, it is possible to achieve both improvement in the estimation precision of the transmission path parameter and the suppression of the performance deterioration factor in the analog devices and the propagation path by adaptively setting N in accordance with the estimation precision of the transmission path parameter and the state of the performance deterioration factor in the analog devices and the propagation path. For example, N is set so as to satisfy BS/N>BNL when an effective pass bandwidth of the cross-phase modulation, which is a non-linear optical effect of the transmission path, is denoted as BNL and the baud rate of the main signal is denoted as BS.

Also, it is only necessary to use different sequences in the X-polarization and the Y-polarization when the training signal is generated in the configuration of the training signal sequence generation unit of FIG. 3 so that the pattern of the training signal sequence satisfies (2) a condition for decreasing a correlation between modulation patterns of two different polarizations (e.g., X-polarization and Y-polarization). Further, when only the condition of (2) is to be satisfied, it is only necessary to set a degree of modulation of a signal pattern to the same multiple as that of the training signal sequence. Specifically, when the training signal sequence length is denoted by L, if only the condition of (2) is to be satisfied, it is only necessary for the sequence in the X-polarization to be VL=(v1, . . . , v1) and it is only necessary for the sequence in the Y-polarization to be VL'=(v2, . . . , v2).

Second Embodiment

Figure 4:
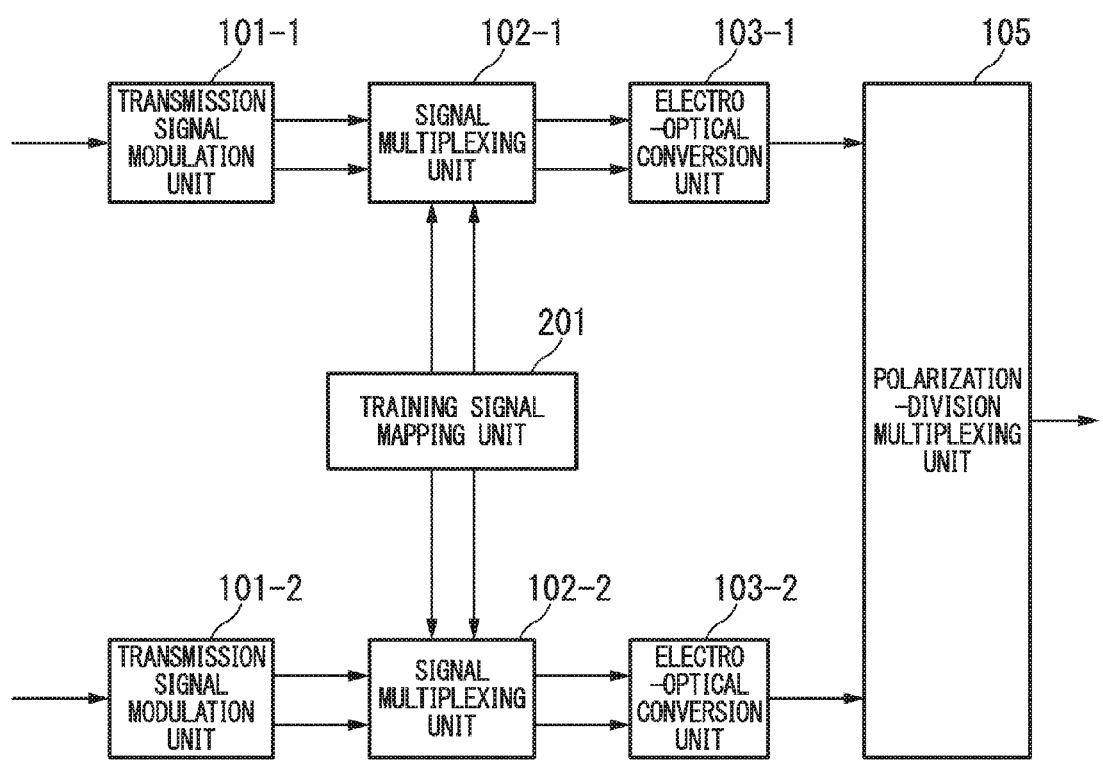
FIG. 4 is a block diagram illustrating a configuration example of an optical signal transmission apparatus in a second embodiment of the present invention.

Next, the second embodiment of the present invention will be described. FIG. 4 is a block diagram illustrating a configuration example of an optical signal transmission apparatus in the second embodiment of the present invention. The second embodiment of the present invention is different from the first embodiment of the present invention in that the training signal sequence generation unit 104 is used as a training signal mapping unit 201. The training signal mapping unit 201 performs symbol mapping on the training signal using the same modulation scheme as that of the transmission signal and generates a training signal sequence.

The present embodiment uses a method for reducing a correlation between the X-polarization and the Y-polarization by using sequence patterns that are orthogonal in the X-polarization and the Y-polarization. That is, in the present embodiment, the training signal mapping unit 201 determines a pattern phase and a low cycle pattern so that a mutual correlation is lowest in a pattern obtained by calculating a product (or exclusive OR) in the X-polarization and the Y-polarization. Hereinafter, a specific sequence pattern will be described for an example of 16 QAM.

Figure 5A:
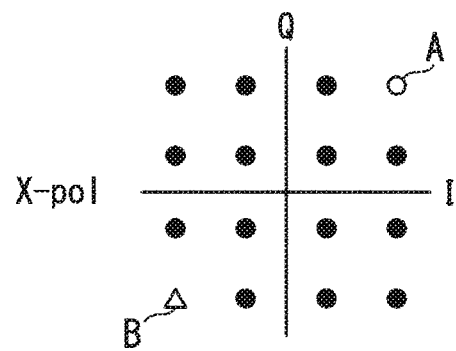
FIG. 5A is an example of symbol mapping of a basic signal pattern of a training signal sequence in the second embodiment of the present invention.
Figure 5B:
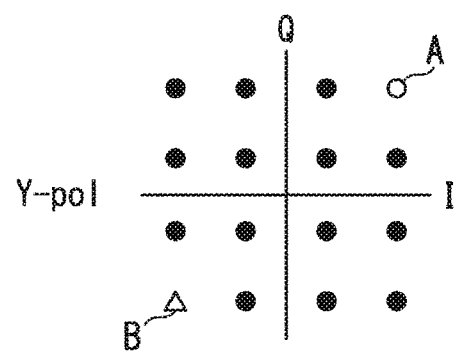
FIG. 5B is an example of symbol mapping of a basic signal pattern of a training signal sequence in the second embodiment of the present invention.

FIGS. 5A and 5B are an example of symbol mapping of a basic signal pattern of a training signal sequence in the present embodiment. The alternating signal of Equations (1) is assumed as the basic pattern and the alternating signal is generated as the basic pattern by alternately using two points (indicated by A and B) symmetrical with respect to the origin. Because a signal (symbol) is constituted of 16 candidate points as illustrated in FIGS. 5A and 5B in the case of 16 QAM, a training signal sequence that satisfies the above-described conditions is generated by generating a sequence from the 16 candidate points.

Figure 6A:
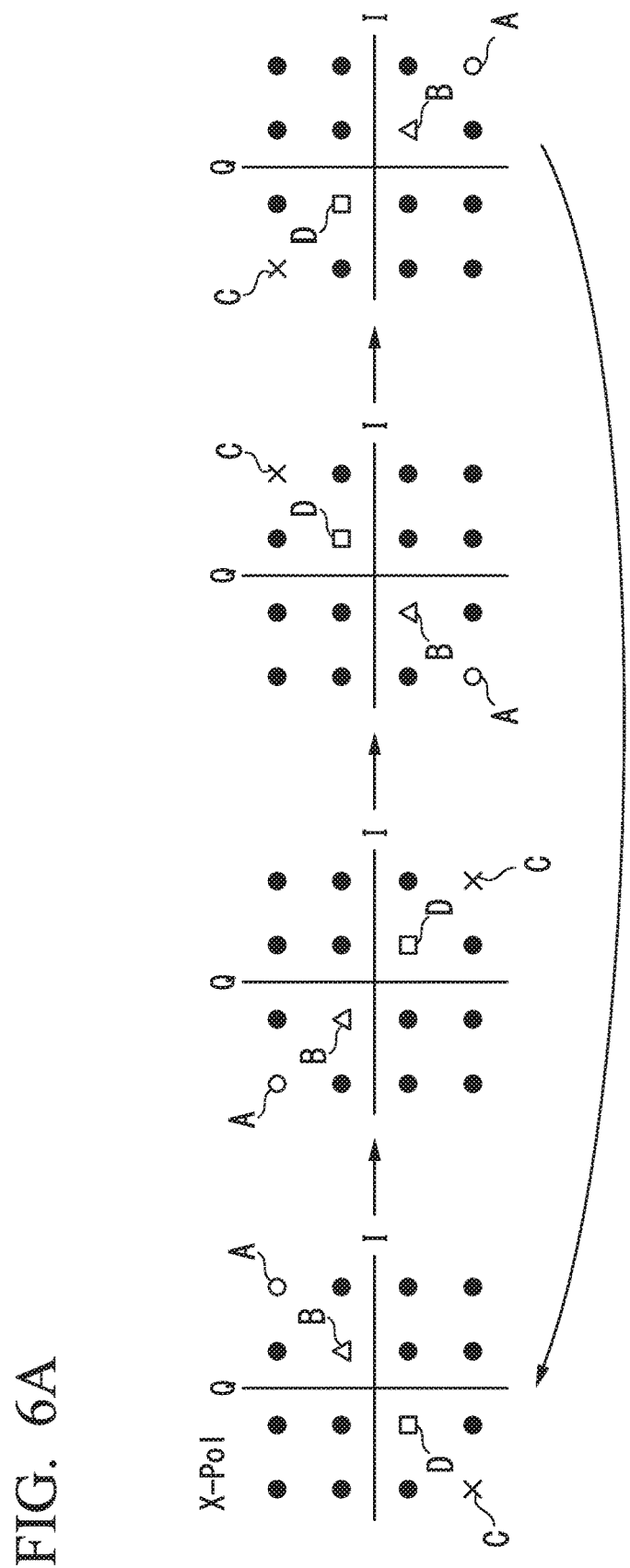
FIG. 6A is a first example of symbol mapping of a training signal sequence in the second embodiment of the present invention.

Next, an example of symbol mapping of a training signal sequence in the training signal mapping unit 201 will be shown. FIGS. 6A and 6B are a first example of symbol mapping of a training signal sequence in the second embodiment of the present invention. As illustrated in FIGS. 6A and 6B, in the first example of symbol mapping of the training signal sequence in the training signal mapping unit 201, an operation of shifting a phase by 90 degrees after sequentially mapping four candidate points (indicated by A, B, C, and D) in the X-polarization and the Y-polarization is iterated. Further, the phase shift of 90 degrees is performed at a positive side in the X-polarization, while the phase shift of 90 degrees is performed at a negative side in the Y-polarization, so that the X-polarization is orthogonal to the Y-polarization. The above operation is performed for Nt symbols of a sequence length.

Figure 7B:
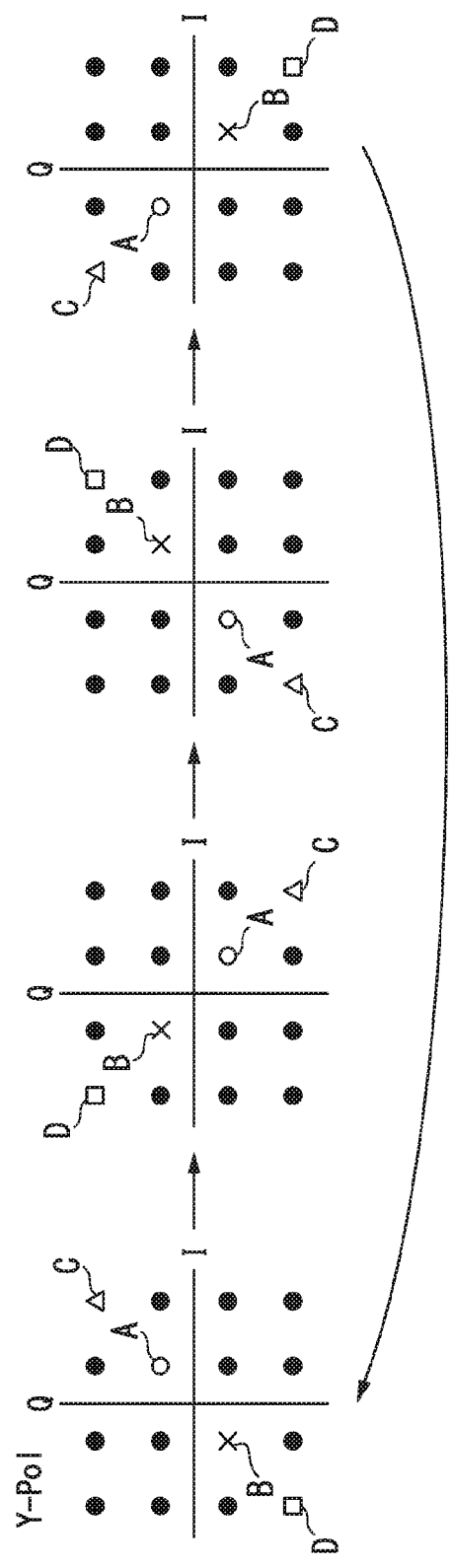
FIG. 7B is a second example of symbol mapping of a training signal sequence.

FIGS. 7A and 7B are a second example of symbol mapping of a training signal sequence in the training signal mapping unit 201. As illustrated in FIGS. 7A and 7B, in the second example of the symbol mapping of the training signal sequence, when sequentially mapping four candidate points (indicated by A, B, C, and D) in the X-polarization and the Y-polarization, an operation of shifting a phase by 90 degrees after mapping an outer side in one of the polarizations when mapping an inner side in the other of the polarizations is iterated. Since the outer side is mapped in one of the polarizations when the inner side is mapped in the other of the polarizations, the same transmission power can be entirely provided for every symbol. Further, the phase shift of 90 degrees is performed at a positive side in the X-polarization, while the phase shift of 90 degrees is performed at a negative side in the Y-polarization, so that the X-polarization is orthogonal to the Y-polarization. The above operation is performed for Nt symbols of a sequence length.

Figure 8A:
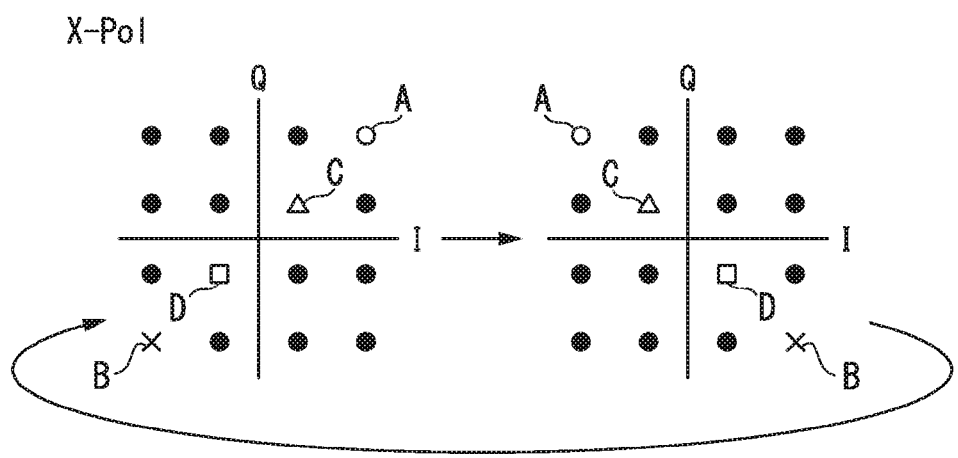
FIG. 8A is a third example of symbol mapping of a training signal sequence.
Figure 8B:
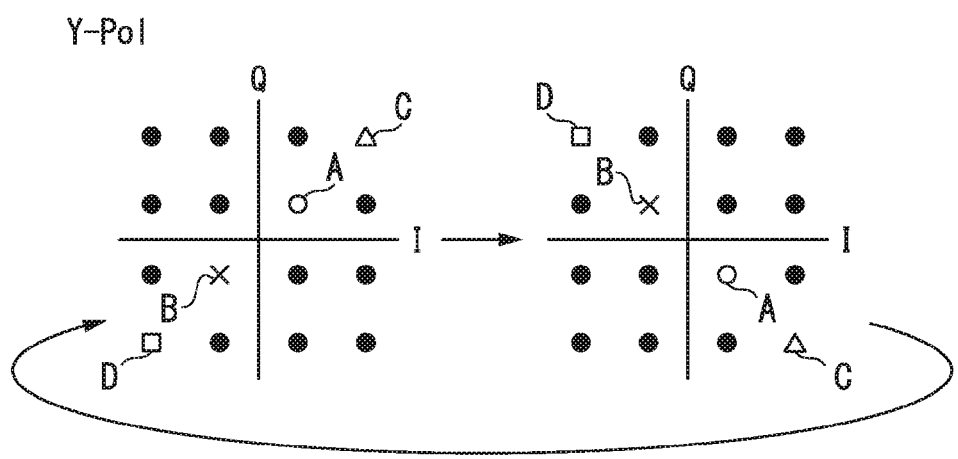
FIG. 8B is a third example of symbol mapping of a training signal sequence.

FIGS. 8A and 8B are a third example of symbol mapping of a training signal sequence in the training signal mapping unit 201. As illustrated in FIGS. 8A and 8B, in the third example of the symbol mapping of the training signal sequence, an operation of shifting the phase by 90 degrees after sequentially mapping four candidate points (indicated by A, B, C, and D) in the X-polarization and the Y-polarization and returning to four initial candidate points after sequentially mapping the four candidate points is iterated. That is, the sequences illustrated in FIGS. 8A and 8B are sequences obtained by extracting only the first-half of the second training signal sequence (FIGS. 7A and 7B). Further, the phase shift of 90 degrees is performed at a positive side in the X-polarization, while the phase shift of 90 degrees is performed at a negative side in the Y-polarization, so that the X-polarization is orthogonal to the Y-polarization. The above operation is performed for Nt symbols of a sequence length.

Figure 9A:
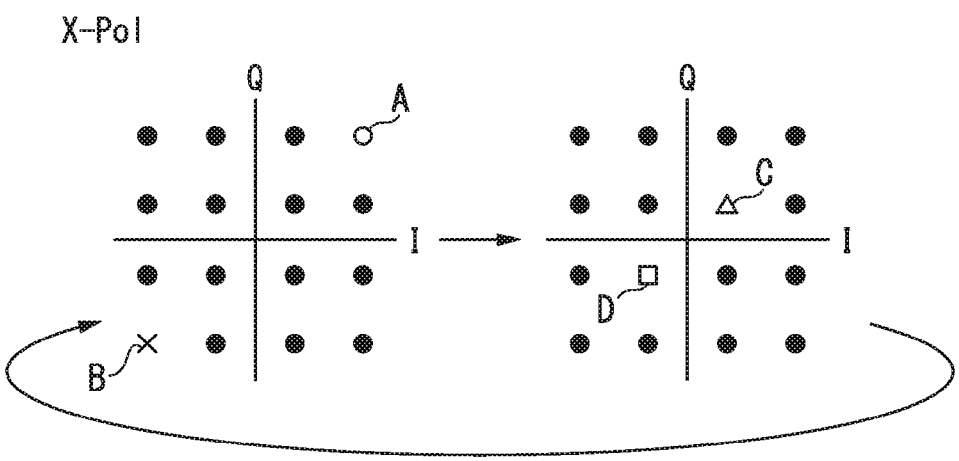
FIG. 9A is a fourth example of symbol mapping of a training signal sequence.
Figure 9B:
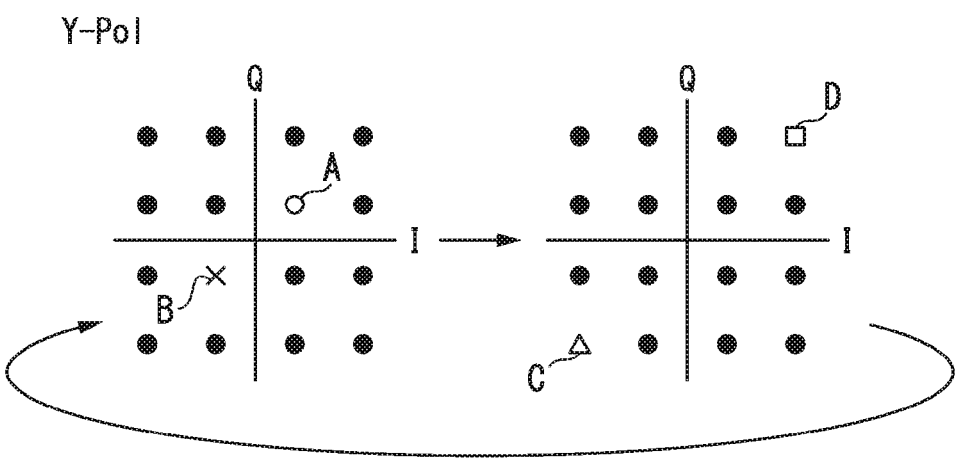
FIG. 9B is a fourth example of symbol mapping of a training signal sequence.

FIGS. 9A and 9B are a fourth example of symbol mapping of a training signal sequence in the training signal mapping unit 201. As illustrated in FIGS. 9A and 9B, in the fourth example of the symbol mapping of the training signal sequence, an operation of sequentially mapping two candidate points (indicated by A and B) in the X-polarization and the Y-polarization, changing the amplitudes in the X-polarization and the Y-polarization, and sequentially mapping two candidate points (indicated by C and D) in the X-polarization and the Y-polarization is iterated. Further, it is possible to entirely provide the same transmission power for every symbol by providing different amplitudes in the X-polarization and the Y-polarization. The above operation is performed for Nt symbols of a sequence length.

Figure 10A:
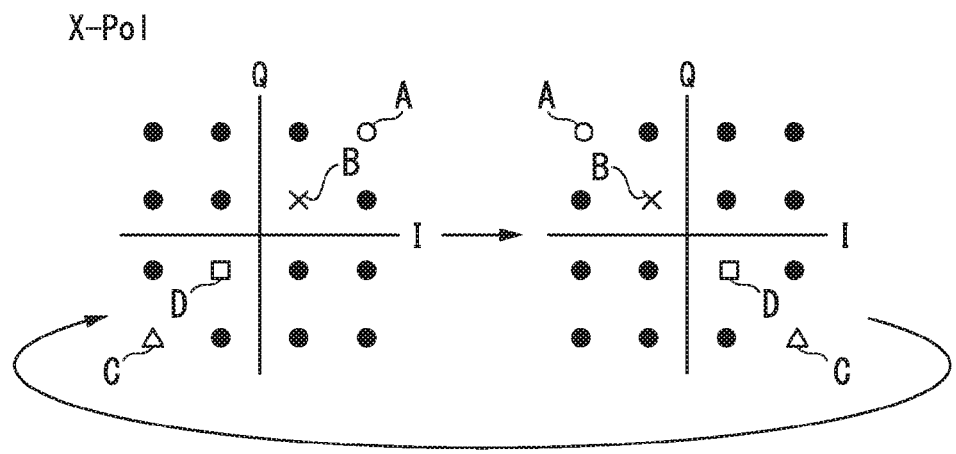
FIG. 10A is a fifth example of symbol mapping of a training signal sequence.
Figure 10B:
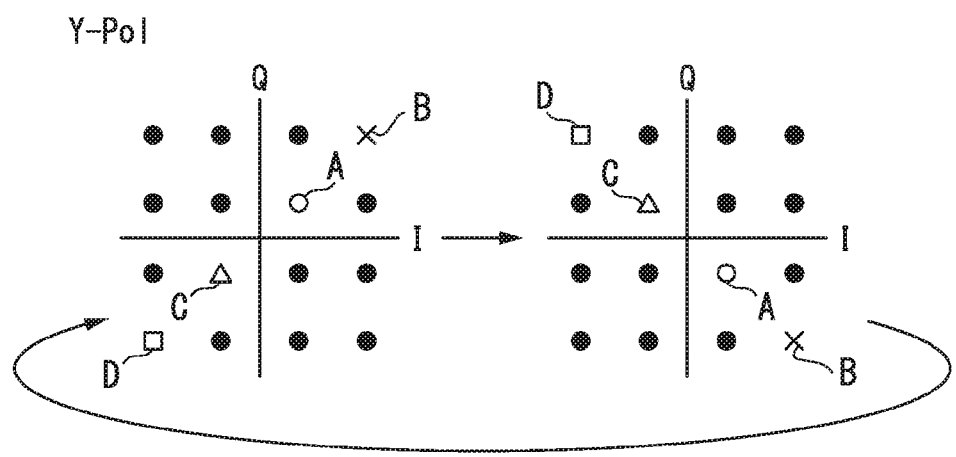
FIG. 10B is a fifth example of symbol mapping of a training signal sequence.

FIGS. 10A and 10B are a fifth example of symbol mapping of a training signal sequence in the training signal mapping unit 201. As illustrated in FIGS. 10A and 10B, in the fifth example of the symbol mapping of the training signal sequence, an operation of shifting the phase by 90 degrees after sequentially mapping four candidate points (indicated by A, B, C, and D) in the X-polarization and the Y-polarization and returning to four initial candidate points after sequentially mapping the four candidate points is iterated. A difference from the third example of the symbol mapping of the training signal sequence is that the amplitude alternately becomes high and low in the case of the fifth example of the symbol mapping of the training signal sequence. The above operation is performed for Nt symbols of a sequence length.

Here, a common point in the above-described five examples of generation of the training signal sequence in the training signal mapping units 201 is that the training signal sequence is generated by using different amplitudes in two different polarizations or by performing different phase modulations for a specific frequency band signal sequence serving as the reference. Also, in the case of M-level modulation, the training signal sequence is generated through symbol mapping after K points (K<M) are selected from M candidate points, and the alternating signal is generated by selecting points symmetrical with respect to the origin as the candidate points when the alternating signal is generated. Further, the phase modulation is applied for polarization scrambling, but the phase modulation is limited to 90 degrees because power of the alternating signal is degraded even at the phase modulation of 90 degrees if XY-polarization modulation is applied. A training signal sequence which achieves both improvement in the estimation precision of the transmission path parameter and the suppression of the performance deterioration factor in the analog devices and the propagation path is generated by generating the training signal sequence as described above.

Figure 11:
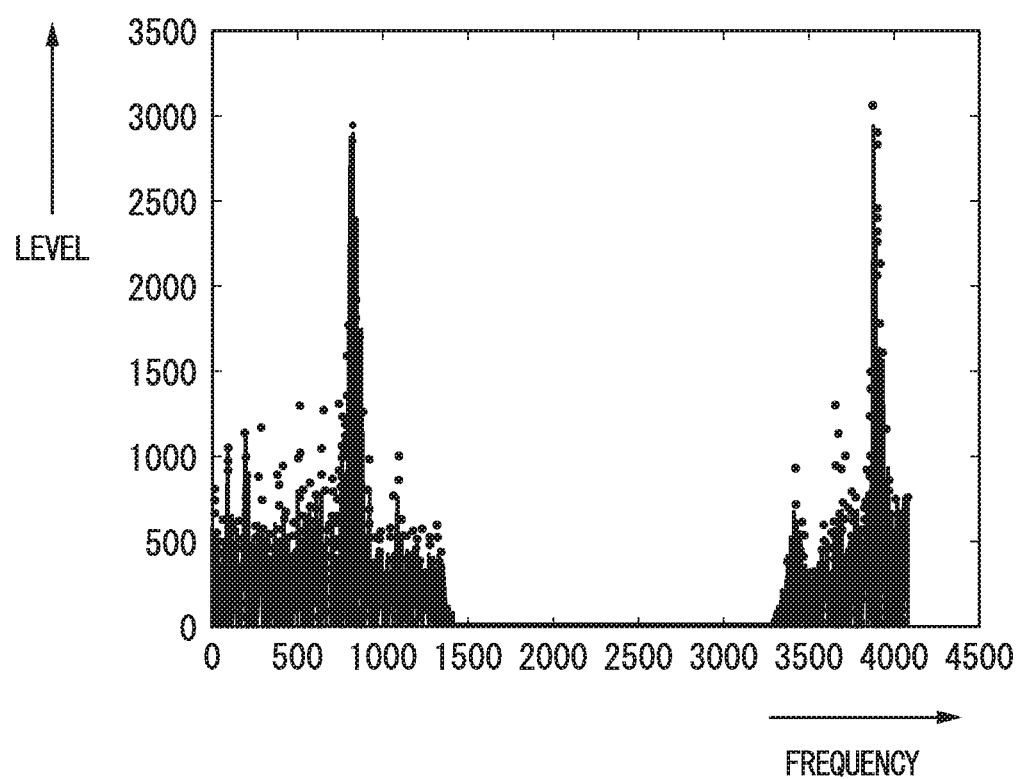
FIG. 11 illustrates a frequency spectrum in the symbol mapping of the first example of the training signal sequence in the second embodiment.
Figure 12:
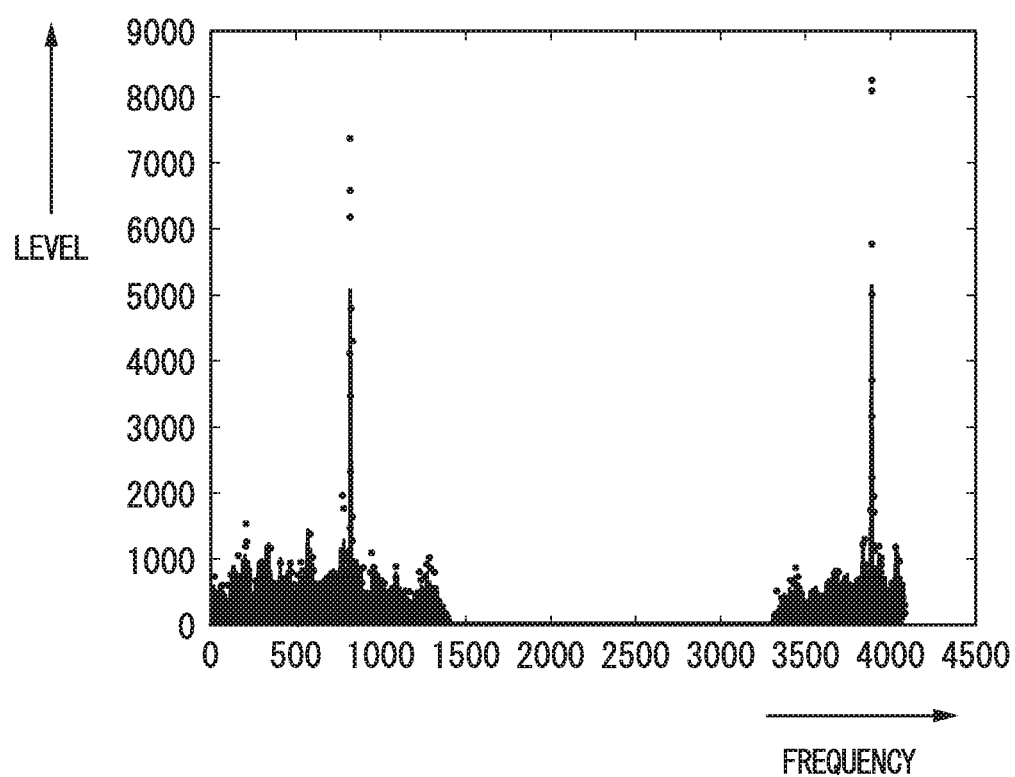
FIG. 12 illustrates a frequency spectrum in the symbol mapping of the fourth example of the training signal sequence in the second embodiment.
Figure 13:
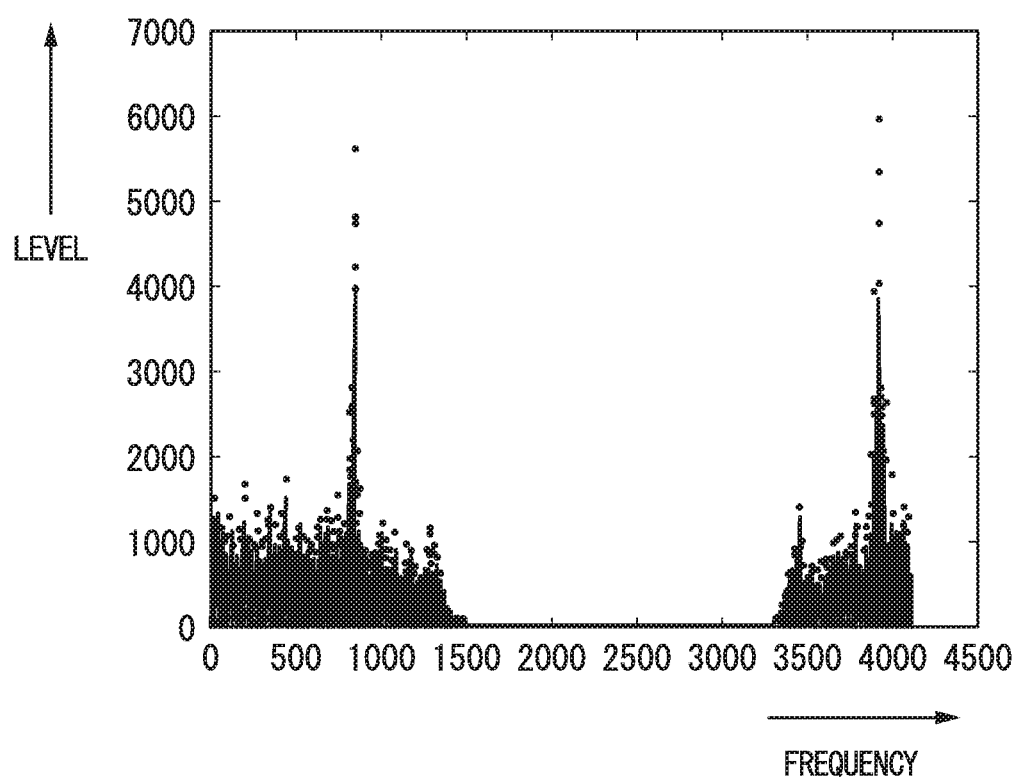
FIG. 13 illustrates a frequency spectrum in the symbol mapping of the fifth example of the training signal sequence in the second embodiment.

FIG. 11 illustrates a frequency spectrum in the symbol mapping of the first example of the training signal sequence in the second embodiment. FIG. 12 illustrates a frequency spectrum in the symbol mapping of the fourth example of the training signal sequence in the second embodiment. FIG. 13 illustrates a frequency spectrum in the symbol mapping of the fifth example of the training signal sequence in the second embodiment. In FIGS. 11 to 13, the horizontal axis represents a frequency (or the number of FFT points when a 4096-point fast Fourier transform (FFT) is performed) and the vertical axis represents a power value at each frequency point. As can be seen from FIGS. 11 to 13, it is possible to modulate two line spectra (specific frequency band signal spectra) generated from an alternating signal sequence and have a bulge in the line spectra by applying the present scheme. Moreover, a bulge (modulation) amount of the line spectra changes depending on the signal sequence pattern of the symbol mapping to be created. In this manner, a training signal sequence for achieving both improvement in the estimation precision of the transmission path parameter and the suppression of the performance deterioration factor in the analog devices and the propagation path is generated by adaptively changing the signal sequence pattern of the training signal depending on the situation.

Although the examples of the five sequences have been described above, the training signal sequence is not limited to these sequences, and it is possible to generate a training signal sequence for achieving both improvement in the estimation precision of the transmission path parameter and the suppression of the performance deterioration factor in the analog devices and the propagation path by rotating the amplitude and/or the phase while maintaining the nature of a basic pattern. Also, it is possible to modify the pattern by iterating D from C Nr2 (Nr2≥2 and Nr2 is an integer) times after iterating B from A Nr1 (Nr1≥2 and Nr1 is an integer) times in the above-described five patterns. Further, there is a method for determining a pattern phase and a low cycle pattern so that the mutual correlation between patterns after exclusive OR is calculated is lowest by shifting pattern phases of low cycle random patterns in the X-polarization and the Y-polarization.

Third Embodiment

Next, the third embodiment of the present invention will be described. The third embodiment is different from the first and second embodiments in that the modulation sequence generation units 1003-1 to 1003-4 perform modulation so that power of a training signal sequence is reduced without spreading the spectrum of the training signal sequence. Because the cross-phase modulation effect is proportional to instantaneous power as described above, it is possible to suppress the deterioration of an error rate caused by cross-phase modulation by reducing the amplitude of the training signal sequence.

Figure 14:
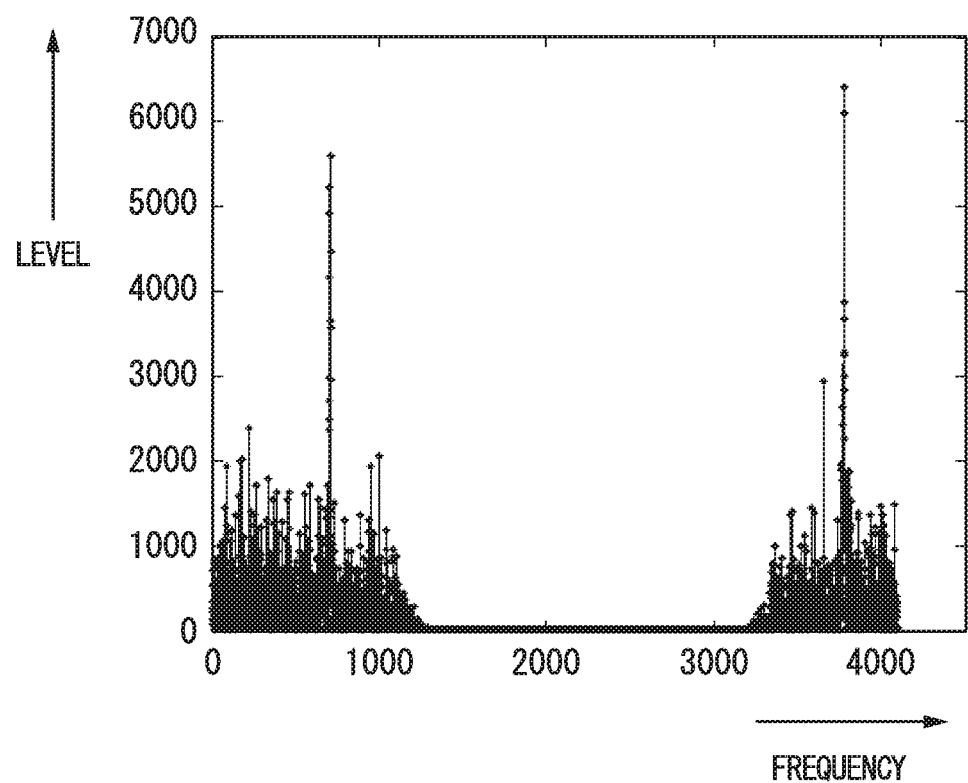
FIG. 14 illustrates an example of a frequency spectrum in the basic symbol mapping of the training signal sequence in the third embodiment.

FIG. 14 illustrates an example of a frequency spectrum in the basic symbol mapping of the training signal sequence in the third embodiment. FIG. 14 is an example of a frequency spectrum of the training signal sequence in 8 QAM and 16 QAM. In this case, the X-polarization and the Y-polarization have the same complex amplitude. When one cycle is defined as four symbols, a basic training signal sequence TS is represented by the following equations.

$$TS(4m-3)=S$$

$$TS(4m-2)=S$$

$$TS(4m-1)=-S$$

$$TS(4m)=-S \qquad \text{(Equations 3)}$$

In Equations 3, m=1, 2, 3, . . . , Nt/4.

When a modulation of a fixed cycle is applied to the basic training signal sequence, an even-numbered training signal sequence TS and an odd-numbered training signal sequence TS can be represented by the following equations.

TS(2*l*−1)=TS(2*l*−1)

TS(2*l*)=a*TS(2*l*)*exp(*i*θ)　　　　(Equations 4)

In Equations 4, l=1, 2, 3, . . . , Nt/2. Moreover, exp denotes the exponential function and i denotes an imaginary unit.

Figure 15:
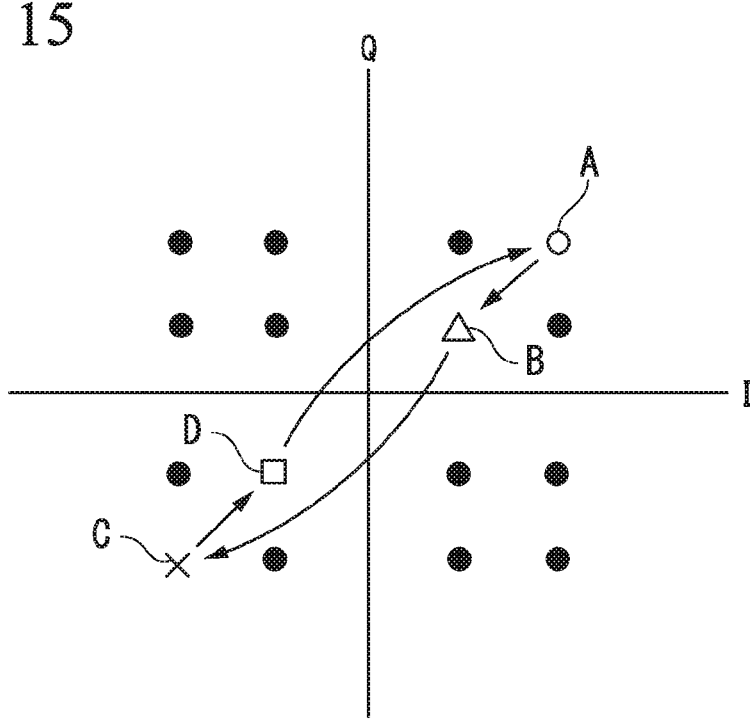
FIG. 15 is an example of a first training signal sequence obtained by amplitude modulation with 16 QAM.

FIG. 15 is an example of a first training signal sequence obtained by amplitude modulation in accordance with 16 QAM. In the example of FIG. 15, when four candidate points (indicated by A, B, C, and D) are sequentially mapped in the X-polarization and the Y-polarization, if a=⅓ and θ=0, the four candidate points are mapped on one straight line passing through the origin. In this manner, the training signal sequence can be set to be on a diagonal line by designating θ=0 at a multi-level of 16 QAM or more.

Figure 16:
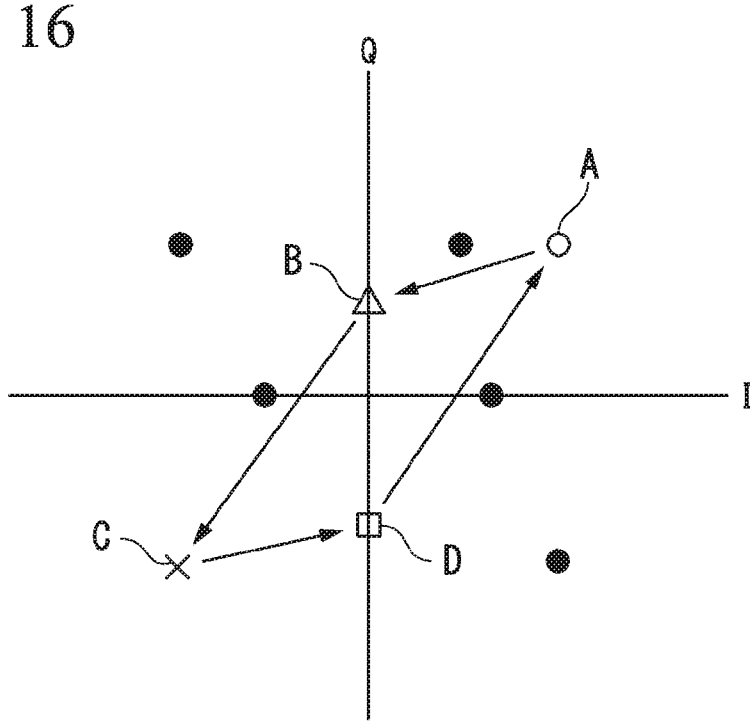
FIG. 16 is an example of a first training signal sequence obtained by amplitude modulation with 8 QAM.

FIG. 16 is an example of a first training signal sequence obtained by amplitude modulation in accordance with 8 QAM. While four candidate points (indicated by A, B, C, and D) can be mapped on one straight line in the X-polarization and the Y-polarization in 16 QAM as in the example of FIG. 15, four candidate points cannot be mapped on one straight line in 8 QAM. Thus, in 8 QAM, the four candidate points are mapped by designating a=½ and θ=π/2.

Figure 17:
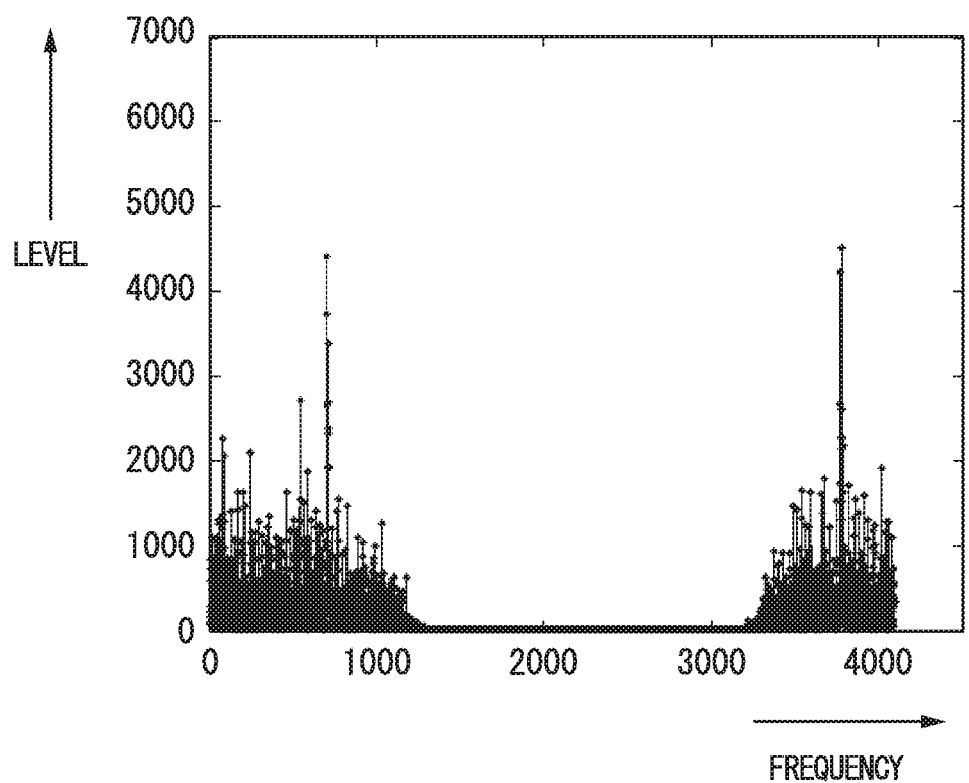
FIG. 17 illustrates an example of a frequency spectrum of a training signal sequence obtained by amplitude modulation with multilevel QAM.

FIG. 17 illustrates an example of a frequency spectrum of a training signal sequence obtained by amplitude modulation in accordance with multi-level QAM. In FIG. 17, it can be seen that power of peak frequency components of the training signal sequence is reduced as compared with FIG. 14. Thereby, it is possible to prevent the deterioration of an error rate caused by cross-phase modulation.

It is to be noted that a and θ shown here are examples and the values of a and 0 may be selected depending on the multi-level so that the peak frequency component of the training signal sequence is reduced. Moreover, although an amplitude value of the even-numbered symbol is multiplied by a in the above-described example, an amplitude value of an odd-numbered symbol may be multiplied. Moreover, different values of a and θ may be used for the training signal sequences of the X-polarization and the Y-polarization. Moreover, the above example has described the case in which modulation with a ½ cycle is applied to TS in which one cycle is defined as four symbols. In modulation in which one cycle is Q symbols for TS in which one cycle is P symbols, any natural numbers P and Q may be selected as long as power of a peak frequency component of the training signal sequence is reduced.

As a guideline, a can be set so that the power of the training signal sequence is equal to or less than that of the data sequence. Thereby, it is possible to reduce the influence of the cross-phase modulation caused by the training signal sequence.

Moreover, in order to reduce the power of the peak frequency component of the training signal sequence, single polarization can be used by setting a random sequence for one of the polarizations, rather than polarization-division multiplexing in which the same information is carried in the X-polarization and the Y-polarization. Thereby, the power of the peak frequency component of the training signal sequence is reduced by 3 dB and simultaneously a polarization state in the interval of a training signal sequence is randomized, and thus it is possible to reduce the influence of a non-linear optical effect caused by the concentration of power.

Detection sensitivity decreases when the training signal sequence is provided in the single polarization, but it is possible to improve sensitivity by partially performing polarization-division multiplexing transmission. For example, polarization-division multiplexing may be used for only sequences of a central portion of the training signal sequence and single polarization may be used for the first sequence and the last sequence.

Fourth Embodiment

Figure 18:
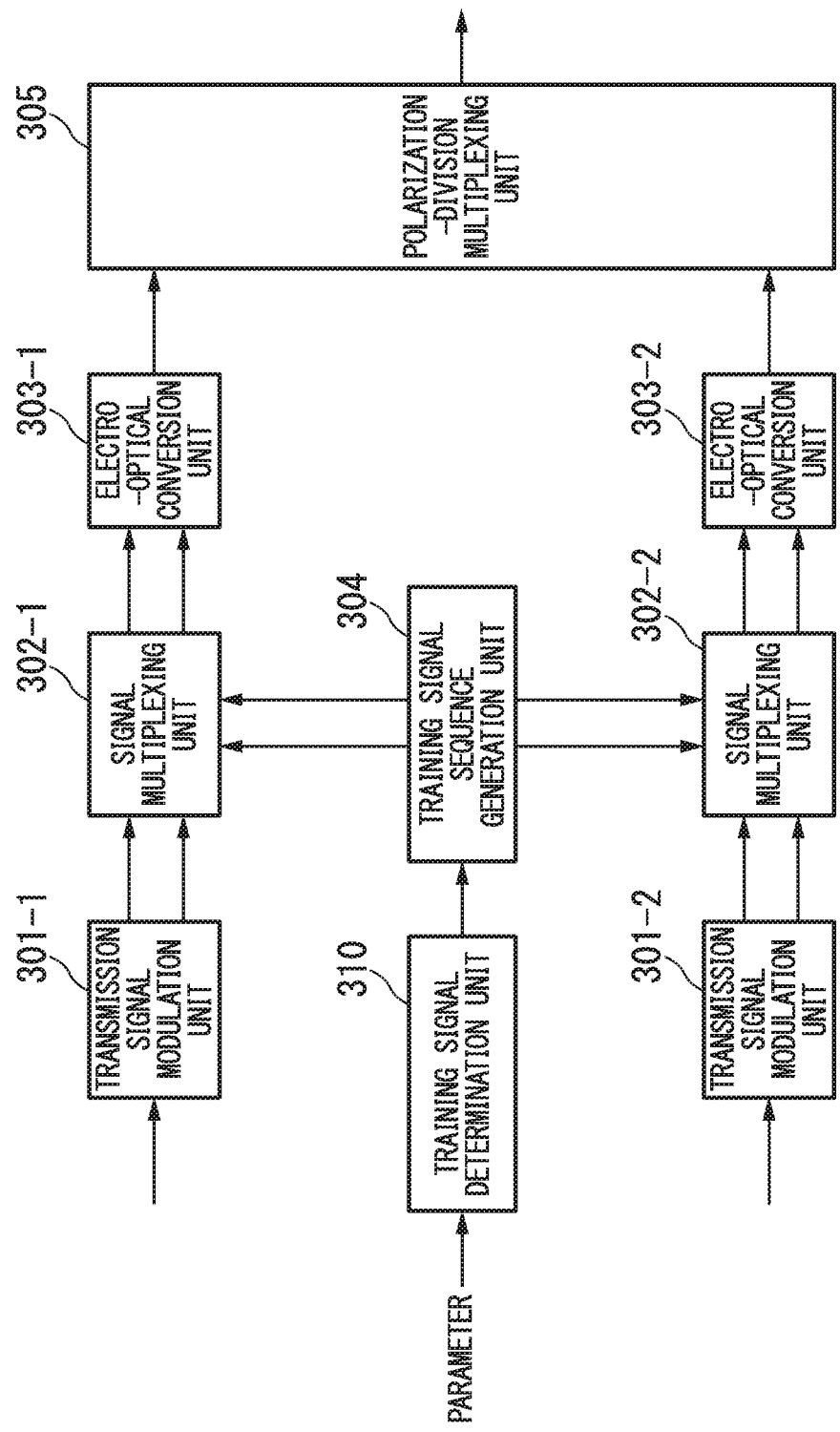
FIG. 18 is a block diagram illustrating a configuration example of an optical signal transmission apparatus in a fourth embodiment of the present invention.

Next, the fourth embodiment of the present invention will be described. FIG. 18 is a block diagram illustrating a configuration example of an optical signal transmission apparatus in the fourth embodiment of the present invention. In FIG. 18, transmission signal modulation units 301-1 and 301-2, signal multiplexing units 302-1 and 302-2, electro-optical conversion units 303-1 and 303-2, a training signal sequence generation unit 304, and a polarization-division multiplexing unit 305 correspond to the transmission signal modulation units 101-1 and 101-2, the signal multiplexing units 102-1 and 102-2, the electro-optical conversion units 103-1 and 103-2, the training signal sequence generation unit 104, and the polarization-division multiplexing unit 105 in the first embodiment.

In the fourth embodiment, a training signal determination unit 310 inputs a required condition (parameter) and determines a training signal sequence in accordance with this parameter. Then, the training signal sequence generation unit 304 generates the training signal sequence determined by the training signal determination unit 310.

Figure 19:
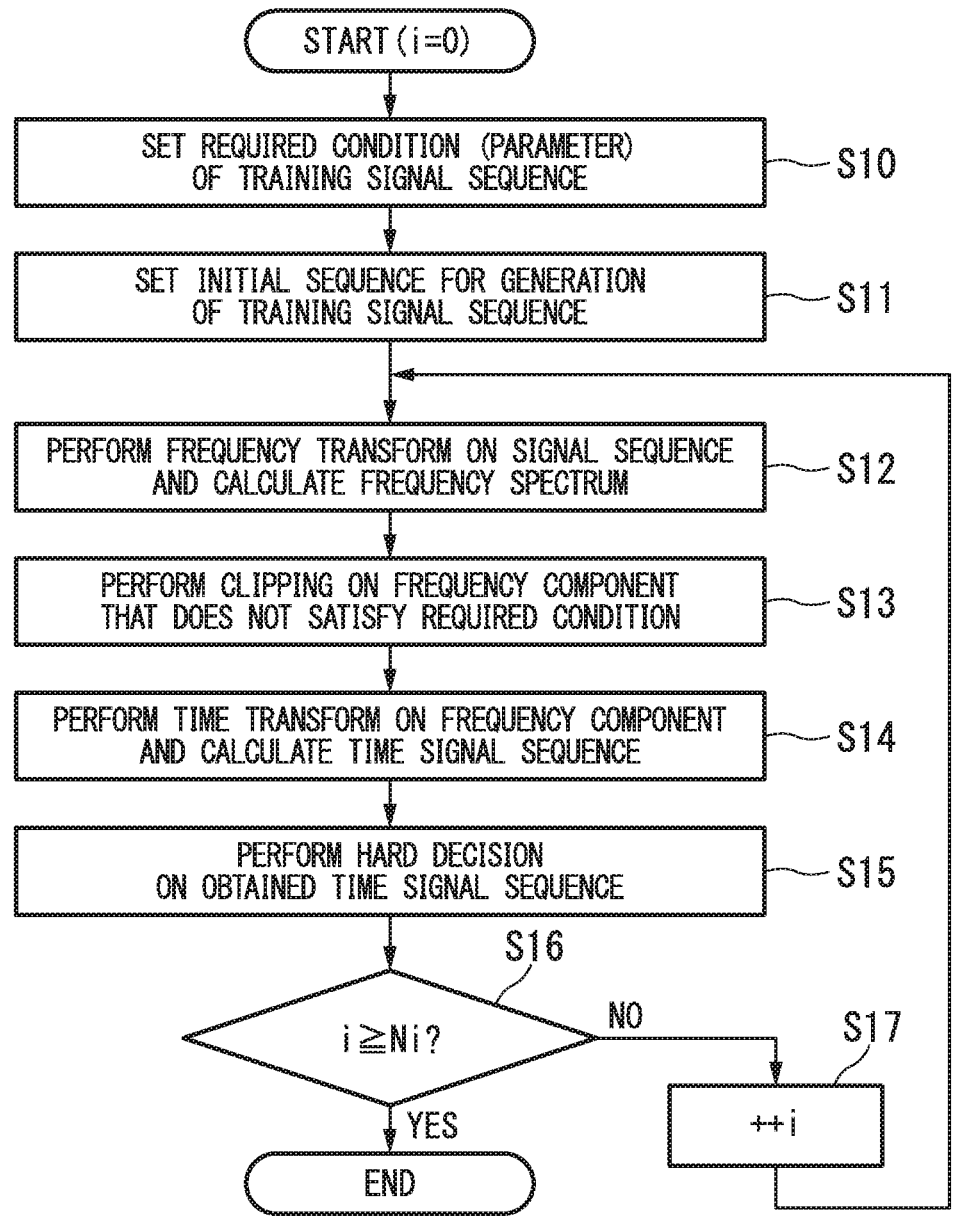
FIG. 19 is a flowchart illustrating a process of determining a training signal in a training signal determination unit 310.

FIG. 19 is a flowchart illustrating a process of determining a training signal sequence in the training signal determination unit 310. In FIG. 19, the required condition (parameter) of the training signal sequence is set in the training signal determination unit 310 (step S10). The required conditions are, for example, a modulation scheme of a training signal sequence, a frequency filter which simulates the shape of the frequency spectrum of the training signal sequence satisfying the condition, its associated parameters (a type, a central frequency, a cutoff frequency, the number of spectra (plural number), other coefficients, and the like), the shape of the spectrum of the training signal sequence to be obtained, a training signal sequence length Nt, and the like.

Next, the training signal determination unit 310 sets an initial sequence for generation of the training signal sequence (step S11). For example, the initial sequence includes a pseudo random sequence (PRBS), a random pattern, and an alternating pattern, different patterns can be used for XI, XQ, YI, and YQ, and an identical pattern may be used therefor. Frequency conversion is performed on the obtained signal sequence to calculate the frequency spectrum (step S12). A frequency conversion method is, for example, an FFT, a discrete Fourier transform (DFT), or the like.

Next, the training signal determination unit 310 performs clipping on a frequency component which does not satisfy the required condition (step S13). For example, the frequency filter set at the time of the initial setting (step S10) is applied to the obtained frequency spectrum or its power values (a sum of squares of XI(k) and XQ(k) or a sum of squares of YI(k) and YQ(k), where k is a frequency). Then, clipping is performed on a frequency component exceeding the value of the frequency filter. Thereafter, the training signal determination unit 310 performs a time conversion on the clipped frequency spectrum to calculate a time signal sequence (step S14). A time conversion method is, for example, an inverse FFT (IFFT), an inverse DFT (IDFT), or the like.

Next, the training signal determination unit 310 performs a hard decision depending on a modulation scheme of a transmission signal on the obtained time signal sequence to obtain a modulated training signal sequence (step S15). The above operation is iterated Ni+1 (Ni≥0 and Ni is an integer) times (steps S16 and S17) and a final result is output as a determined training signal sequence. The training signal sequence generation unit 304 generates the determined training signal sequence.

It is to be noted that it may not be necessary to perform the hard decision in step S15. For example, the hard decision is unnecessary when the modulation scheme of the training signal sequence is not particularly defined or the resolution of a digital-to-analog converter (D/A converter) at a transmission end is affordable.

Moreover, it is possible to achieve methods for frame synchronization, frequency synchronization, chromatic dispersion estimation, and the like in the optical signal reception apparatus, for example, using the methods disclosed in Patent Document 1 or the like.

Moreover, processes of the units may be performed by recording a program for achieving all or part of the functions of the optical signal transmission apparatus on a computer-readable recording medium and causing a computer system to read and execute the program recorded on the recording medium. It is to be noted that the "computer system" referred to here is assumed to include an operating system (OS) and hardware such as peripheral devices.

Moreover, the computer system is assumed to include a homepage providing environment (or displaying environment) when a World Wide Web (WWW) system is used.

In addition, the "computer-readable recording medium" refers to a storage apparatus including a portable medium such as a flexible disk, a magneto-optical disc, a read only memory (ROM), or a compact disc (CD)-ROM, and a hard disk embedded in the computer system. Further, the "computer-readable recording medium" is assumed to also include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system which functions as a server or a client when the program is transmitted. In addition, the above-described program may be a program which achieves part of the above-described functions. Further, the program may be a program which achieves the above-described functions in combination with a program already recorded in the computer system.

Although embodiments of the present invention have been described above in detail with reference to the drawings, specific configurations are not limited to the embodiments, and a design change or the like that does not depart from the gist of the present invention may also be included.

INDUSTRIAL APPLICABILITY

The present invention can be applied to, for example, optical communication. In accordance with the present invention, it is possible to suppress the deterioration of performance quality of a data signal caused by a training signal.

DESCRIPTION OF REFERENCE SIGNS

101-1, 101-2, 301-1, 301-2 Transmission signal modulation unit
102-1, 102-2, 302-1, 302-2 Signal multiplexing unit
103-1, 103-2, 303-1, 303-2 Electro-optical conversion unit
104, 304 Training signal sequence generation unit
105, 305 Polarization-division multiplexing unit
1001 Basic signal sequence generation unit
1002-1 to 1002-4 Multiplier
1003-1 to 1003-4 Modulation sequence generation unit

The invention claimed is:

1. An optical signal transmission apparatus comprising:
    a modulation unit which modulates a transmission signal;
    a training signal sequence generation unit which generates a training signal sequence by generating a plurality of signal sequences which have power concentrated in a plurality of different frequency bands and subsequently modulating at least one of an amplitude and a phase of the plurality of signal sequences;
    a signal multiplexing unit which appends the training signal sequence to the transmission signal; and
    an electro-optical conversion unit which converts a signal sequence obtained by appending the training signal sequence to the transmission signal into an optical signal and transmits the optical signal.

2. The optical signal transmission apparatus according to claim 1, wherein the training signal sequence generation unit comprises:
    a basic signal sequence generation unit which generates a specific frequency band signal in which a frequency component having higher power than a data sequence is concentrated only in a specific frequency band;
    a modulation sequence generation unit which generates a modulation sequence for modulating the frequency component; and
    a multiplier which multiplies an output sequence of the basic signal sequence generation unit by an output sequence of the modulation sequence generation unit.

3. The optical signal transmission apparatus according to claim 2, wherein the modulation sequence generation unit modulates at least one of the amplitude and the phase so that a power component that is present in the specific frequency band of the specific frequency band signal and is higher than that of the data sequence is subjected to frequency spreading.

4. The optical signal transmission apparatus according to claim 3, wherein the modulation sequence generation unit generates the modulation sequence based on estimation precision of a transmission path parameter and a performance deterioration factor in at least one of an analog device and a propagation path.

5. The optical signal transmission apparatus according to claim 4, wherein the modulation sequence generation unit generates a sequence which changes at a time interval of a main signal symbol of N symbols as the modulation sequence, and adjusts a degree of modulation of the frequency component of the specific frequency band signal by setting a value of N based on the estimation precision of the transmission path parameter and the performance deterioration factor in at least one of the analog device and the propagation path and changing a modulation rate of the generated modulation sequence.

6. The optical signal transmission apparatus according to claim 2, wherein the modulation sequence generation unit generates the modulation sequence based on an effective pass bandwidth of cross-phase modulation, which is a non-linear optical effect of a transmission path, and a baud rate of a main signal.

7. The optical signal transmission apparatus according to claim 2, wherein the modulation sequence generation unit modulates at least one of the amplitude and the phase so that a power component that is present in the specific frequency band of the specific frequency band signal and is higher than that of a data sequence is not subjected to frequency spreading.

8. The optical signal transmission apparatus according to claim 7, wherein the modulation sequence generation unit modulates at least one of the amplitude and the phase so that power of the training signal sequence is equal to or less than power of the data sequence.

9. The optical signal transmission apparatus according to claim 1, wherein the training signal sequence generation unit generates the training signal sequence by performing modulation in which at least one of the amplitude and the phase is different between first polarization and second polarization which are different from each other.

10. The optical signal transmission apparatus according to claim 9, wherein the training signal sequence generation unit determines pattern phases and low cycle patterns of training signal sequences in the first polarization and the second polarization so that a correlation between the first polarization and the second polarization is lowest in a pattern obtained by calculating a product or exclusive OR of the training signal sequences in the first polarization and the second polarization.

11. The optical signal transmission apparatus according to claim 1, wherein the training signal sequence generation unit generates the training signal sequence from M candidate points when multi-level modulation of an M level is performed on the transmission signal.

12. The optical signal transmission apparatus according to claim 11, wherein the training signal sequence generation unit generates the training signal sequence by limiting phase modulation serving as polarization scrambling to 90 degrees.

13. The optical signal transmission apparatus according to claim 11, wherein when the multi-level modulation of the M level is performed on the transmission signal, the training signal sequence generation unit selects candidate points which are smaller in number than M and are symmetrical with respect to an origin from among the M candidate points and generates the training signal sequence using the selected candidate points.

14. The optical signal transmission apparatus according to claim 1, further comprising a training signal determination unit which determines the training signal sequence in accordance with a parameter of a required condition, wherein the training signal determination unit determines the training signal sequence by performing clipping on an initial sequence for generation of the training signal sequence using a frequency filter which simulates a shape of a frequency spectrum of the training signal sequence satisfying the required condition.

15. The optical signal transmission apparatus according to claim 14, wherein the training signal determination unit makes initial sequences for generation of the training signal sequence different between the first polarization and the second polarization.

16. The optical signal transmission apparatus according to claim 14, wherein the training signal determination unit performs a hard decision in accordance with a modulation scheme of the transmission signal on the training signal sequence subjected to the clipping by the frequency filter.

17. The optical signal transmission apparatus according to claim 16, wherein the training signal determination unit iterates the hard decision in accordance with the clipping by the frequency filter and the modulation scheme of the transmission signal.

18. An optical signal transmission method comprising:

modulating a transmission signal;

generating a training signal sequence by generating a plurality of signal sequences having power concentrated in a plurality of different frequency bands and subsequently modulating at least one of an amplitude and a phase of the plurality of signal sequences;

appending the training signal sequence to the transmission signal; and converting a signal sequence obtained by appending the training signal sequence to the transmission signal into an optical signal and transmitting the optical signal.

* * * * *